(12) United States Patent
Yoshimura et al.

(10) Patent No.: US 11,770,843 B2
(45) Date of Patent: Sep. 26, 2023

(54) TERMINAL APPARATUS, BASE STATION APPARATUS, AND COMMUNICATION METHOD

(71) Applicant: SHARP KABUSHIKI KAISHA, Sakai (JP)

(72) Inventors: Tomoki Yoshimura, Sakai (JP); Shoichi Suzuki, Sakai (JP); Wataru Ouchi, Sakai (JP); Liqing Liu, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 75 days.

(21) Appl. No.: 16/759,668

(22) PCT Filed: Nov. 2, 2018

(86) PCT No.: PCT/JP2018/040846
§ 371 (c)(1),
(2) Date: Apr. 27, 2020

(87) PCT Pub. No.: WO2019/088254
PCT Pub. Date: May 9, 2019

(65) Prior Publication Data
US 2020/0296728 A1    Sep. 17, 2020

(30) Foreign Application Priority Data
Nov. 2, 2017    (JP) .................................. 2017-212606

(51) Int. Cl.
*H04W 72/53*    (2023.01)
*H04L 5/00*    (2006.01)
(Continued)

(52) U.S. Cl.
CPC ........... *H04W 72/53* (2023.01); *H04L 5/0092* (2013.01); *H04W 24/08* (2013.01);
(Continued)

(58) Field of Classification Search
None
See application file for complete search history.

(56) References Cited

U.S. PATENT DOCUMENTS

| 2013/0064174 | A1 | 3/2013 | Kim et al. | |
| 2014/0247796 | A1* | 9/2014 | Ouchi | H04W 52/40 370/329 |

(Continued)

FOREIGN PATENT DOCUMENTS

JP    2013-534075 A    8/2013

OTHER PUBLICATIONS

NTT DOCOMO, "New SID proposal: Study on New Radio Access Technology", RP-160671, 3GPP TSG RAN Meeting #71, Göteborg, Sweden, Mar. 7-10, 2016.

(Continued)

*Primary Examiner* — Srinivasa R Reddivalam
(74) *Attorney, Agent, or Firm* — ScienBiziP, P.C.

(57) ABSTRACT

A terminal apparatus that communicates with a base station apparatus by using a cell including a first downlink carrier bandwidth part and a second downlink carrier bandwidth part includes a receiver configured to monitor a PDCCH in the first downlink carrier bandwidth part and a decoder configured to decode a PDSCH in the first downlink carrier bandwidth part based on a DCI format included in the PDCCH. The DCI format includes frequency domain resource assignment information of the PDSCH, and a size of the frequency resource assignment information is given at least based on the number of resource blocks included in the second downlink carrier bandwidth part.

6 Claims, 11 Drawing Sheets

(51) Int. Cl.
  *H04W 24/08* (2009.01)
  *H04W 72/0446* (2023.01)
  *H04W 72/0453* (2023.01)
  *H04W 72/1273* (2023.01)
  *H04W 72/23* (2023.01)

(52) U.S. Cl.
  CPC .............. *H04W 72/0446* (2013.01); *H04W 72/0453* (2013.01); *H04W 72/1273* (2013.01); *H04W 72/23* (2023.01)

(56) References Cited

U.S. PATENT DOCUMENTS

| | | | |
|---|---|---|---|
| 2015/0249974 A1 | 9/2015 | Lee et al. | |
| 2017/0019163 A1* | 1/2017 | Yoshimoto | H04L 5/0035 |
| 2018/0279135 A1* | 9/2018 | Hwang | H04W 72/23 |
| 2018/0324843 A1* | 11/2018 | Lee | H04W 48/04 |
| 2019/0021119 A1* | 1/2019 | Ng | H04W 74/006 |
| 2019/0074929 A1* | 3/2019 | Aiba | H04L 1/0028 |
| 2019/0104543 A1* | 4/2019 | Park | H04W 8/24 |
| 2019/0342870 A1* | 11/2019 | Shen | H04L 1/1642 |
| 2020/0021410 A1* | 1/2020 | Choi | H04L 5/0007 |
| 2020/0037260 A1* | 1/2020 | Fu | H04L 27/2646 |
| 2021/0211913 A1* | 7/2021 | Takeda | H04W 72/23 |

OTHER PUBLICATIONS

Huawei et al., "Bandwidth part activation and adaptation", R1-1717905, 3GPP Tsg Ran WG1 Meeting #90bis, Prague, Czech Republic, Oct. 9-13, 2017.
Yunjung Yi, "DCI Design and TBS Determination for NR", U.S. Appl. No. 62/558,362, filed Sep. 15, 2017, Document type: Certified copy of priority document made available for PCT/KR2018/010640, Date of issue of the certificate: Sep. 20, 2018.
Mediatek Inc., "Summary of Offline Discussion on Bandwidth Part Operation", R1-1716832 3GPP TSG RAN WG1 Meeting NR#3, Nagoya, Japan, Sep. 18-21, 2017.
Mediatek Inc., "Discussions on search space and CORESET designs", R1-1716198 3GPP TSG RAN WG1 Meeting AH_NR#3, Nagoya, Japan, Sep. 18-21, 2017.
Catt, "Offline summary for AI 7.1.2.2 Remaining details on Remaining Minimum System Information", R1-1719145 Updated from R1-1719033 3GPP TSG RAN WG1 Meeting 90bis, Prague, CZ, Oct. 9-13, 2017.
Mediatek Inc., "Remaining Details on Bandwidth Part Operation in NR", R1-1718327, vol. RAN WG1, No. Prague, CZ; Oct. 9, 2017-Oct. 13, 2017, Oct. 3, 2017 Retrieved from the Internet: URL:http://www.3gpp.org/ftp/tsg_ran/WG1_RL1/TSGR1_90b/Docs/.

* cited by examiner

Figure A: Table of number of OFDM symbols per slot $N^{slot}_{symb}$, $\mu_{slot}$ for subcarrier spacing configuration $\mu$ and normal cyclic prefix

| $\mu$ | $N^{slot}_{symb}$ | slot_configuration | | | | |
|---|---|---|---|---|---|---|
| | | 0 | | 1 | | |
| | | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Figure B: Table of number of OFDM symbols per slot $N^{slot}_{symb}$, $\mu_{slot}$ for subcarrier spacing configuration $\mu$ and extended cyclic prefix

| $\mu$ | $N^{slot}_{symb}$ | slot_configuration | | | | |
|---|---|---|---|---|---|---|
| | | 0 | | 1 | | |
| | | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 2 | 12 | 40 | 4 | 6 | 80 | 8 |

FIG. 2

RBG Pattern A (RBG size $N_{RBG}$ = 4)

| RBG#0 | RBG#1 | RBG#2 | RBG#3 | RBG#4 | RBG#5 | RBG#6 |

RBG Pattern A (RBG size $N_{RBG}$ = 2)

| RBG#0 | RBG#1 | RBG#2 | RBG#3 | RBG#4 | RBG#5 | RBG#6 | RBG#7 | RBG#8 | RBG#9 | RBG#10 | RBG#11 | RBG#12 | #13 |

| #0 | #1 | #2 | #3 | #4 | #5 | #6 | #7 | #8 | #9 | #10 | #11 | #12 | #13 | #14 | #15 | #16 | #17 | #18 | #19 | #20 | #21 | #22 | #23 | #24 | #25 | #26 |

Resource block index

FIG. 4

| CODE POINT | CARRIER BANDWIDTH PART |
|---|---|
| 00 | CARRIER BANDWIDTH PART #0 |
| 01 | CARRIER BANDWIDTH PART #1 |
| 10 | CARRIER BANDWIDTH PART #2 |
| 11 | CARRIER BANDWIDTH PART #3 |

FIG. 5

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2017-212606 filed on Nov. 2, 2017, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as user equipment (UE). LTE is a cellular communication system in which multiple areas are deployed in a cell structure, with each of the multiple areas being covered by a base station apparatus. A single base station apparatus may manage multiple serving cells.

3GPP has studied standards for the next generation (New Radio or NR) (NPL 1) to make a proposal for International Mobile Telecommunications (IMT)-2020, a standard for next-generation mobile communication systems, standardized by the International Telecommunications Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7 to 10 Mar. 2016.

SUMMARY OF INVENTION

Technical Problem

One aspect of the present invention provides a terminal apparatus capable of efficiently performing communication, a communication method used for the terminal apparatus, a base station apparatus capable of efficiently performing communication, and a communication method used for the base station apparatus.

Solution to Problem (1) A first aspect of the present invention is a terminal apparatus that communicates with a base station apparatus by using a cell including a first downlink carrier bandwidth part and a second downlink carrier bandwidth part, the terminal apparatus including a receiver configured to monitor a PDCCH in the first downlink carrier bandwidth part, and a decoder configured to decode a PDSCH in the first downlink carrier bandwidth part based on a DCI format included in the PDCCH, in which the DCI format includes frequency domain resource assignment information for the PDSCH, and a size of the frequency resource assignment information is given at least based on the number of resource blocks included in the second downlink carrier bandwidth part.

In addition, in the first aspect of the present invention, the first downlink carrier bandwidth part is a downlink active carrier bandwidth part, and the second downlink carrier bandwidth part corresponds to a control resource set configured in an MIB.

In addition, in the first aspect of the present invention, the first downlink carrier bandwidth part is a downlink active carrier bandwidth part, and the second downlink carrier bandwidth part is configured in system information.

In addition, in the first aspect of the present invention, the DCI format is a first DCI format, and a size of the frequency domain resource assignment information included in a second DCI format is given at least based on the number of resource blocks included in the first downlink carrier bandwidth part.

(2) A second aspect of the present invention is a base station apparatus that communicates with a terminal apparatus by using a cell including a first downlink carrier bandwidth part and a second downlink carrier bandwidth part, the base station apparatus including a transmitter configured to transmit a PDCCH and a PDSCH in the first downlink carrier bandwidth part, in which a DCI format included in the PDCCH includes frequency domain resource assignment information for the PDSCH, and a size of the frequency resource assignment information is given at least based on the number of resource blocks included in the second downlink carrier bandwidth part.

In addition, in the second aspect of the present invention, the first downlink carrier bandwidth part is a downlink active carrier bandwidth part, and the second downlink carrier bandwidth part corresponds to a control resource set configured in an MIB.

In addition, in the second aspect of the present invention, the first downlink carrier bandwidth part is a downlink active carrier bandwidth part, and the second downlink carrier bandwidth part is configured in system information.

In addition, in the second aspect of the present invention, the DCI format is a first DCI format, and a size of the frequency domain resource assignment information included in a second DCI format is given at least based on the number of resource blocks included in the first downlink carrier bandwidth part.

(3) A third aspect of the present invention is a communication method used by a terminal apparatus that communicates with a base station apparatus by using a cell including a first downlink carrier bandwidth part and a second downlink carrier bandwidth part, the communication method including monitoring a PDCCH in the first downlink carrier bandwidth part, and decoding a PDSCH in the first downlink carrier bandwidth part based on a DCI format included in the PDCCH, in which the DCI format includes frequency domain resource assignment information for the PDSCH, and a size of the frequency resource assignment information is given at least based on the number of resource blocks included in the second downlink carrier bandwidth part.

(4) A fourth aspect of the present invention is a communication method used by a base station apparatus that communicates with a terminal apparatus by using a cell including a first downlink carrier bandwidth part and a second downlink carrier bandwidth part, the communication method including transmitting a PDCCH and a PDSCH in the first downlink carrier bandwidth part, in which a DCI format included in the PDCCH includes frequency domain resource assignment information for the PDSCH, and a size of the frequency resource assignment information is given at least based on the number of resource blocks included in the second downlink carrier bandwidth part.

Advantageous Effects of Invention

According to one aspect of the present invention, the terminal apparatus can efficiently perform communication. In addition, the base station apparatus can efficiently perform communication.

BRIEF DESCRIPTION OF DRAWINGS

FIG. 2 is an example illustrating a relationship between $N^{slot}_{symb}$, a subcarrier spacing configuration μ, a slot configuration, and a CP configuration according to an aspect of the present embodiment.

FIG. 4 is a diagram illustrating an example of a method for determining a size of a resource assignment information field according to an aspect of the present embodiment.

FIG. 5 is a diagram illustrating an example of CBP indication information fields according to an aspect of the present embodiment.

DESCRIPTION OF EMBODIMENTS

Embodiments of the present invention will be described below.

Figure 1:
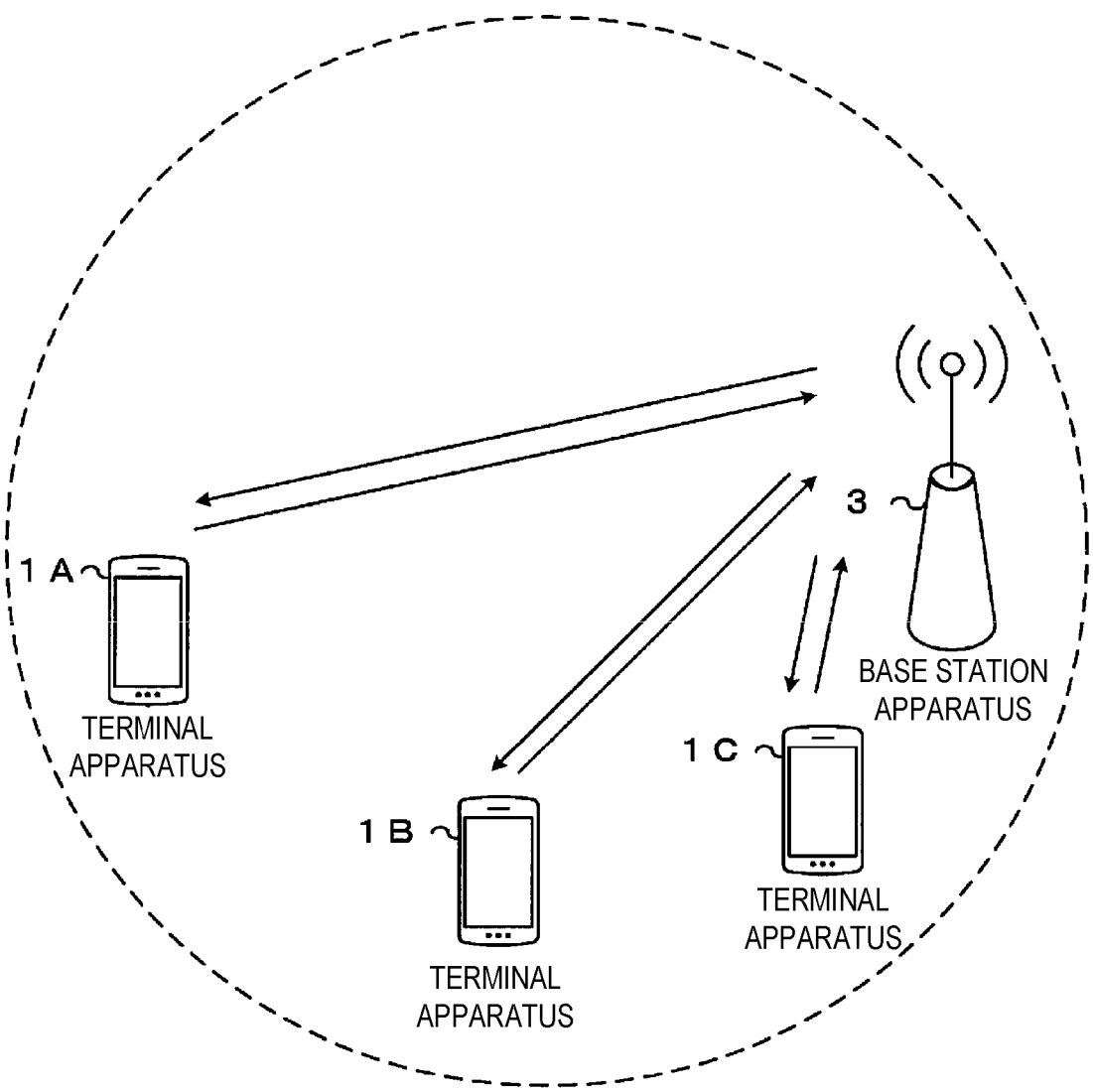
FIG. 1 is a conceptual diagram of a radio communication system according to one aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, the terminal apparatuses 1A to 1C are each also referred to as a terminal apparatus 1.

Hereinafter, a frame structure will be described.

In the radio communication system according to an aspect of the present embodiment, at least Orthogonal Frequency Division Multiplexing (OFDM) is used. An OFDM symbol, which is a unit of the time domain for OFDM, includes at least one or multiple subcarriers and is converted into a time-continuous signal in generation of a baseband signal.

With respect to subcarrier spacing (SCS), subcarrier spacing $\Delta f = 2^\mu \ast 15$ kHz may be given. For example, μ may be any value from 0 to 5. For a carrier bandwidth part (CBP), μ used to configure subcarrier spacing may be given as a parameter of a higher layer (subcarrier spacing configuration μ).

In the radio communication system according to an aspect of the present embodiment, a time unit $T_s$ is used for representing a length of the time domain. A time unit $T_s$ is given as $T_s = 1/(\Delta f_{max} \ast N_f)$. $\Delta f_{max}$ may be the maximum value of the subcarrier spacing supported by the radio communication system according to an aspect of the present embodiment. $\Delta f_{max}$ may be $\Delta f_{max} = 480$ kHz. The time unit $T_s$ is also referred to as $T_s$. A constant κ is $\kappa = \Delta f_{max} \ast N_f / (\Delta f_{ref} N_{f,\,ref}) = 64$. $\Delta f_{ref}$ is 15 kHz and $N_{f,\,ref}$ is 2048.

The constant κ may be a value indicating a relationship between reference subcarrier spacing and $T_s$. The constant κ may be used for a length of a subframe. The number of slots included in the subframe may be given at least based on the constant κ. $\Delta f_{ref}$ is the reference subcarrier spacing, and $N_{f,\,ref}$ is a value corresponding to the reference subcarrier spacing.

Downlink transmission and/or uplink transmission is configured with frames each having a length of 10 ms. A frame is configured to include 10 subframes. A length of the subframe is 1 ms. A length of the frame may be a value that is independent of the subcarrier spacing Δf. That is, the frame may be configured independently of μ. The length of the subframe may be a value that is independent of the subcarrier spacing Δf. That is, the subframe may be configured independently of p.

For the subcarrier spacing configuration μ (subcarrier spacing configuration), the number and indices of slots included in the subframe may be given. For example, a first slot number $n^\mu_s$ may be given in ascending order ranging from 0 to $N^{subframe,\,\mu}_{slot}$ in a subframe. For the subcarrier spacing configuration μ, the number and indices of slots included in a frame may be given. For example, a second slot number $n^\mu_{s,f}$ may be given in ascending order ranging from 0 to $N^{frame,\,\mu}_{slot}$ within a frame. $N^{slot}_{symb}$ consecutive OFDM symbols may be included in one slot. $N^{slot}_{symb}$ may be given at least based on part or all of a slot configuration and a Cyclic Prefix (CP) configuration. The slot configuration may be given by a higher layer parameter slot_configuration. The CP configuration may be given at least based on a higher layer parameter.

FIG. 2 is an example illustrating a relationship between $N^{slot}_{symb}$, the subcarrier spacing configuration μ, a slot configuration, and a CP configuration according to an aspect of the present embodiment. In FIG. 2A, in a case that the slot configuration is zero and the CP configuration is a normal cyclic prefix (normal CP), $N^{slot}_{symb} = 14$, $N^{frame,\,\mu}_{slot} = 40$, and $N^{subframe,\,\mu}_{slot} = 4$. In addition, in FIG. 2B, in a case that the slot configuration is zero and the CP configuration is an extended cyclic prefix (extended CP), $N^{slot}_{symb} = 12$, $N^{frame,\,\mu}_{slot} = 40$, and $N^{subframe,\,\mu}_{slot} = 4$. The $N^{slot}_{symb}$ in the slot configuration 0 may support twice the number of the $N^{slot}_{symb}$ in the slot configuration 1.

Physical resources will be described below.

An antenna port is defined in such a manner that a channel on which a symbols on one antenna port is conveyed can be inferred from a channel on which another symbol on the same antenna port is conveyed. In a case that a large scale property of the channel on which the symbol on one antenna port is conveyed can be inferred from the channel on which the symbol on another antenna port is conveyed, the two antenna ports are said to be Quasi Co-Located (QCL). The large scale property may be a long term performance of a channel. The large scale properties include at least some or all of delay spread, Doppler spread, Doppler shift, average gain, average delay, and spatial Rx parameters. A first antenna port and a second antenna port being QCL with respect to a beam parameter may mean that a reception beam assumed by the reception side for the first antenna port may be the same as a reception beam assumed by the reception side for the second antenna port. The first antenna port and the second antenna port being QCL with respect to a beam parameter may mean that a transmission beam assumed by the reception side for the first antenna port may be the same as a transmission beam assumed by the reception side for the second antenna port. In a case that a large scale property of a channel on which a symbol on one antenna port is conveyed is inferred from a channel on which a symbol on another antenna port is conveyed, the terminal apparatus 1 may assume the two antenna ports to be QCL. Two antenna ports being QCL may mean that the two antenna ports are assumed to be QCL.

For configuring subcarrier spacing and setting carriers, a resource grid including $N^\mu_{RB,x} N^{RB}_{sc}$ subcarriers and $N^{(\mu)}_{symb} N^{subframe,\mu}_{symb}$ OFDM symbols is given. $N^\mu_{RB,x}$ may indicate the number of resource blocks given for the subcarrier spacing configuration μ for a carrier x. The carrier x indicates either a downlink carrier or an uplink carrier. In other words, x is "DL" or "UL". $N^\mu_{RB}$ is a designation and includes $N^\mu_{RB, DL}$ and $N^\mu_{RB, UL}$. $N^{RB}_{sc}$ may indicate the number of subcarriers included in one resource block. One resource grid may be given for each antenna port μ and/or for each subcarrier spacing configuration μ and/or for each Transmission direction configuration. The transmission direction includes at least Downlink (DL) and Uplink (UL). Hereinafter, a set of parameters including at least some or all of the antenna port μ, the subcarrier spacing configuration μ, and the transmission direction configuration is also referred to as a first radio parameter set. That is, one resource grid may be given for each first radio parameter set.

A carrier corresponding to a serving cell in downlink is referred to as a downlink carrier (or a downlink component carrier). A carrier corresponding to a serving cell in uplink is referred to as an uplink carrier (uplink component carrier). A downlink component carrier and an uplink component carrier are collectively referred to as a component carrier.

Each element in the resource grid given for each first radio parameter set is referred to as a resource element. The resource element is identified by an index k of the frequency domain and an index l of the time domain. The resource element identified by the index k of the frequency domain and the index l of the time domain is also referred to as a resource element (k, l). The index k of the frequency domain indicates any value from 0 to $N^\mu_{RB} N^{RB}_{sc} - 1$. $N^\mu_{RB}$ may be the number of resource blocks given for the subcarrier spacing configuration μ. $N^{RB}_{sc}$ is the number of subcarriers included in a resource block, and $N^{RB}_{sc} = 12$. The index k of the frequency domain may correspond to a subcarrier index. The index l of the time domain may correspond to an OFDM symbol index.

Figure 3:
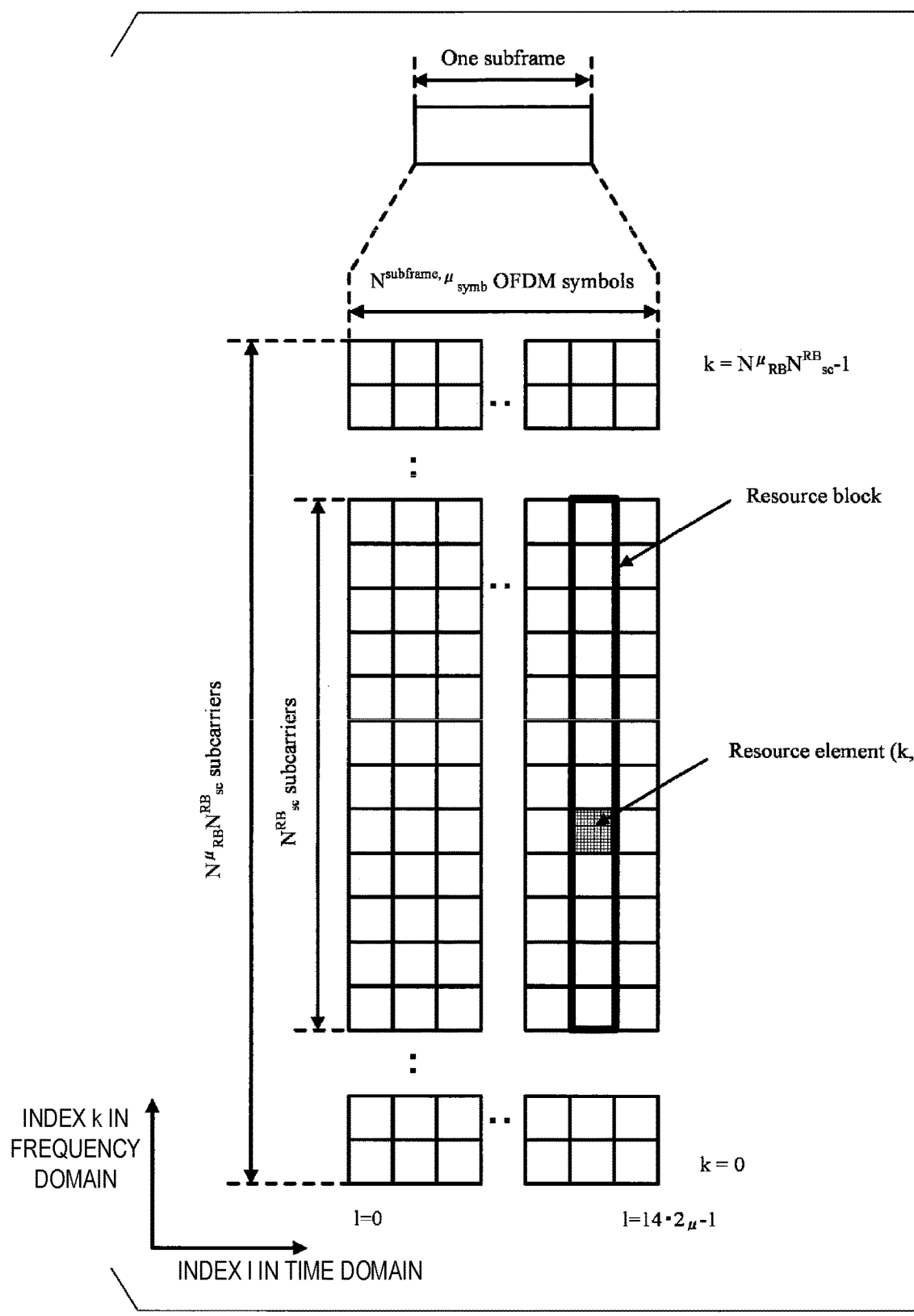
FIG. 3 is a schematic diagram illustrating an example of a resource grid in a subframe according to an aspect of the present embodiment.

FIG. 3 is a schematic diagram illustrating an example of a resource grid in a subframe according to an aspect of the present embodiment. In the resource grid of FIG. 3, the horizontal axis is the index l of the time domain, and the vertical axis is the index k of the frequency domain. In one subframe, the frequency domain of the resource grid includes $N^\mu_{RB} N^{RB}_{sc}$ subcarriers and the time domain of the resource grid may include 14*μ OFDM symbols. A resource block includes $N^{RB}_{sc}$ subcarriers. The time domain of the resource block may correspond to one OFDM symbol.

The time domain of the resource block may correspond to one or multiple slots. The time domain of the resource block may correspond to one subframe.

The terminal apparatus 1 may receive indication to perform transmission and/or reception by using only a subset of the resource grid. The subset of the resource grid is also referred to as a carrier bandwidth part, and the carrier bandwidth part may be given using a higher layer parameter and/or DCI. The carrier bandwidth part is also referred to as a bandwidth part (BP). That is, the terminal apparatus may not receive indication to perform transmission and/or reception by using all sets of resource grids. In other words, the terminal apparatus may receive indication to perform transmission and/or reception by using some resources within the resource grid. One carrier bandwidth part may include multiple resource blocks in the frequency domain. One carrier bandwidth part may include multiple consecutive resource blocks in the frequency domain. A carrier bandwidth part is also referred to as a BandWidth Part (BWP). A carrier bandwidth part configured for a downlink carrier is also referred to as a downlink carrier bandwidth part. A carrier bandwidth part configured for an uplink carrier is also referred to as an uplink carrier bandwidth part.

A set of downlink carrier bandwidth parts may be configured for each serving cell. The set of downlink carrier bandwidth parts may include one or multiple downlink carrier bandwidth parts. A set of uplink carrier bandwidth parts may be configured for each serving cell. The set of uplink carrier bandwidth parts may include one or multiple uplink carrier bandwidth parts.

A higher layer parameter is a parameter included in higher layer signaling. The higher layer signaling may be a Radio Resource Control (RRC) signaling or a Medium Access Control Control Element (MAC CE). Here, the higher layer signaling may be RRC layer signaling or MAC layer signaling.

The higher layer signaling may be common RRC signaling. The common RRC signaling has at least some or all of the following features C1 to C3. Feature C1) Being mapped to a BCCH logical channel or a CCCH logical channel Feature C2) Including at least a radioResourceConfigCommon information element Feature 3) Being mapped to a PBCH The radioResourceConfigCommon information element may include information indicating a configuration commonly used in a serving cell. The configuration commonly used in the serving cell may include at least a PRACH configuration. The PRACH configuration may indicate at least a set of one or multiple random access preamble indices. The PRACH configuration may indicate at least a time/frequency resource of a PRACH.

The higher layer signaling may be dedicated RRC signaling. The dedicated RRC signaling has at least some or all of the following features D1) and D2. Feature D1) Being mapped to a DCCH logical channel Feature D2) Including at least a radioResourceConfigDedicated information element The radioResourceConfigDedicated information element may include at least information indicating a configuration specific to the terminal apparatus 1. The radioResourceConfigDedicated information element may include at least information indicating a configuration of a carrier bandwidth part 512 and/or a carrier bandwidth part 513. The configuration of the carrier bandwidth part 512 may indicate at least a frequency resource of the carrier bandwidth part 512. The configuration of the carrier bandwidth part 513 may indicate at least a frequency resource of the carrier bandwidth part 513.

For example, MIB, first system information, and second system information may be included in the common RRC signaling. In addition, a higher layer message that is mapped to a DCCH logical channel and includes at least radioResourceConfigCommon may be included in the common RRC signaling. In addition, a higher layer message that is mapped to a DCCH logical channel and does not include radioResourceConfigCommon may be included in the dedicated RRC signaling. In addition, a higher layer message that is mapped to a DCCH logical channel and includes at least radioResourceConfigDedicated may be included in the dedicated RRC signaling.

The first system information may include at least a time index of a Synchronization Signal (SS) block (SS/PBCH block). The first system information may include at least information of a PRACH resource. The first system information may include at least information on a configuration of initial connection. The second system information may be system information other than the first system information.

The radioResourceConfigDedicated information element may include at least information of the PRACH resource. The radioResourceConfigDedicated information element may include at least information on the configuration of initial connection.

A physical channel and a physical signal according to various aspects of the present embodiment will be described below.

An uplink physical channel may correspond to a set of resource elements that conveys information generated in a higher layer. The uplink physical channel is a physical channel used in uplink. In the radio communication system according to an aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH is used to transmit uplink control information (UCI). The uplink control information includes some or all of Channel State Information (CSI) of a downlink physical channel; a Scheduling Request (SR); and a Hybrid Automatic Repeat request ACKnowledgement (HARQ-ACK) for downlink data (a transport block or TB, a Medium Access Control Protocol Data Unit or MAC PDU, a DownLink-Shared Channel or DL-SCH, or a Physical Downlink Shared Channel or PDSCH). The HARQ-ACK may indicate an acknowledgement (ACK) or a negative-acknowledgement (NACK) corresponding to downlink data.

The HARQ-ACK may indicate an ACK or an NACK corresponding to each of one or multiple Code Block Groups (CBGs) included in the downlink data. The HARQ-ACK is also referred to as HARQ feedback, HARQ information, HARQ control information, and a ACK/NACK.

A scheduling request may be at least used to request PUSCH (UL-SCH: Uplink-Shared Channel) resources for initial transmission.

The Channel State Information (CSI) includes at least a Channel Quality Indicator (CQI) and a Rank Indicator (RI). The channel quality indicator may include a Precoder Matrix Indicator (PMI). The CQI is an indicator associated with channel quality (propagation strength), and the PMI is an indicator indicating a precoder. The RI is an indicator indicating a transmission rank (or the number of transmission layers).

The PUSCH is used to transmit uplink data (TB, MAC PDU, UL-SCH, and PUSCH). The PUSCH may be used to transmit a HARQ-ACK and/or channel state information along with the uplink data. Furthermore, the PUSCH may be used to transmit only the channel state information or to transmit only the HARQ-ACK and the channel state information. The PUSCH is used to transmit a random access message 3.

The PRACH may be used to transmit a random access preamble (random access message 1). The PRACH is used to indicate an initial connection establishment procedure, a handover procedure, a connection re-establishment procedure, synchronization (timing adjustment) for uplink data transmission, and a request for a PUSCH (UL-SCH) resource. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

In FIG. 1, the following uplink physical signals are used for uplink radio communication. The uplink physical signals may not be used to transmit information output from a higher layer, but is used by a physical layer.

UpLink Demodulation Reference Signal (UL DMRS)
Sounding Reference Signal (SRS)
UpLink Phase Tracking Reference Signal (UL PTRS)

The UL DMRS is associated with transmission of a PUSCH and/or a PUCCH. The UL DMRS is multiplexed with the PUSCH or the PUCCH. The base station apparatus 3 may use the UL DMRS in order to perform channel compensation of the PUSCH or the PUCCH. Transmission of both a PUSCH and a UL DMRS associated with the PUSCH will be hereinafter referred to simply as transmission of a PUSCH. Transmission of both a PUCCH and a UL DMRS associated with the PUCCH will be hereinafter referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The SRS may not be associated with transmission of the PUSCH or the PUCCH. The base station apparatus 3 may use the SRS for measuring a channel state. The SRS may be transmitted at the end of a subframe in an uplink slot or in a predetermined number of OFDM symbols from the end.

The UL PTRS may be a reference signal that is at least used for phase tracking. The UL PTRS may be associated with a UL DMRS group including at least an antenna port used for one or multiple UL DMRSs. The association of the UL PTRS with UL DMRS group may mean that the antenna port for the UL PTRS and some or all of the antenna ports included in the UL DMRS group are at least QCL. The UL DMRS group may be identified at least based on the antenna port of the lowest index for the UL DMRS included in the UL DMRS group.

In FIG. 1, the following downlink physical channels are used for downlink radio communication from the base station apparatus 3 to the terminal apparatus 1. The downlink physical channels are used by the physical layer for transmission of information output from a higher layer.

Physical Broadcast Channel (PBCH)
Physical Downlink Control Channel (PDCCH)
Physical Downlink Shared Channel (PDSCH)

The PBCH is used to transmit a master information block (MIB, BCH, or Broadcast Channel). The PBCH may be transmitted at a prescribed transmission interval. For example, the PBCH may be transmitted at an interval of 80 ms. Contents of information included in the PBCH may be updated at every 80 ms. The PBCH may include 288 subcarriers. The PBCH may include 2, 3, or 4 OFDM symbols. The MIB may include information on an identifier (index) of a synchronization signal. The MIB may include information indicating at least some of numbers of a slot, a subframe, and a radio frame in which a PBCH is transmitted.

The PDCCH is used to transmit downlink control information (DCI). The downlink control information is also called a DCI format. The downlink control information may include at least either a downlink grant or an uplink grant. The DCI format used for scheduling of the PDSCH may be referred to as a downlink grant. The DCI format used for scheduling of the PUSCH may be referred to as an uplink grant. The downlink grant is also referred to as downlink assignment or downlink allocation.

The DCI format may include at least some or all of a Transport Block Size (TBS) information field mapped to information bits at least indicating a size of a transport block (TBS) transmitted in a PDSCH; a resource assignment information field mapped to information bits at least indicating a set of resource blocks to which the PDSCH is mapped in the frequency domain; an MCS information field mapped to information bits at least indicating a modulation scheme for the PDSCH; an HARQ process number information field mapped to information bits at least indicating an HARQ process number corresponding to the transport block; a New Data Indicator (NDI) indication information field mapped to information bits at least indicating an NDI corresponding to the transport block; and a Redundancy Version (RV) information field mapped to information bits at least indicating an RV for the transport block.

The one or multiple information fields included in the DCI format may be mapped to information bits given through joint coding of multiple pieces of indication information. For example, the DCI format may include the MCS information field mapped to information bits given at least based on joint coding of information of the TBS and information indicating a modulation scheme for the PDSCH.

The DCI format may be either a first DCI format or a second DCI format. Some or all of the fields included in the first DCI format may be given at least based on dedicated RRC signaling. The set of information fields included in the second DCI format may be given regardless of the dedicated RRC signaling. The set of information fields included in the second DCI format may be given based on common RRC signaling.

The size of a resource assignment information field included in the first DCI format may be given at least based on the dedicated RRC signaling. The size of the resource assignment information field included in the second DCI format may be given regardless of the dedicated RRC signaling. The size of the resource assignment information field included in the second DCI format may be given based on the common RRC signaling.

The size of the resource assignment information field may be given at least based on the number of resource blocks included in a carrier bandwidth part in the frequency domain.

FIG. 4 is a diagram illustrating an example of a method for determining a size of a resource assignment information field according to an aspect of the present embodiment. In FIG. 4, the number of resource blocks $N_{RB\_CBP}$ included in a carrier bandwidth part in the frequency domain is configured to 27. In the pattern A of FIG. 4, a size of an RBG $N_{RBG}$ is configured to 4, and in the pattern B of FIG. 4, a size of an RBG $N_{RBG}$ is configured to 2. In the pattern A of FIG. 4, the number of Resource Block Groups (RBGs) $N_{RBG\_CBP}$ in the carrier bandwidth part is 7. In the pattern B of FIG. 4, the number of RBGs $N_{RBG\_CBP}$ in the carrier bandwidth part is 14. The number of RBGs $N_{RBG\_CBP}$ in the carrier bandwidth part is given at least based on the number of resource blocks $N_{RB\_CBP}$ and the size of an RBG $N_{RBG}$ included in the carrier bandwidth part in the frequency domain. The number of RBGs $N_{RBG\_CBP}$ in the carrier bandwidth part may be given by $N_{RBG\_CBP}=\mathrm{ceil}\,(N_{RB\_CBP}/N_{RBG})$. Here, ceil $(X_{value})$ may be a ceiling function for $X_{value}$. ceil $(X_{value})$ may be a minimum integer in a range of values not less than $X_{value}$. The number of RBGs $N_{RBG\_CBP}$ in the carrier bandwidth part may be given by $N_{RBG\_CBP}=\mathrm{floor}\,(N_{RB\_CBP}/N_{RBG})$. Here, floor $(X_{value})$ may be a floor function for $X_{value}$. floor $(X_{value})$ may be a maximum integer in a range of values not more than $X_{value}$.

In various aspects of the present embodiment, unless otherwise specified, the number of resource blocks indicates the number of resource blocks in the frequency domain.

In a first resource assignment method, a size of the resource assignment information field may be the same as the number of Resource Block Groups (RBGs). The first resource assignment method is a method for indicating a set of resource blocks to which the PDSCH is mapped by bitmapping the RBGs.

In a second resource assignment method, a size of the resource assignment information field may be given by ceil $(\log_2(N_{RB\_CBP}\times(N_{RB\_CBP}-1)/2))$. In the second resource assignment method, a size of the resource assignment information field may be given by ceil $(\log_2(N_{RBG\_CBP}\times(N_{RBG\_CBP}-1)/2))$. The second resource assignment method may be a method for indicating continuous resource block indexes as a set of resource blocks to which PDSCHs are mapped. The second resource assignment method may be a method for indicating a resource block corresponding to a resource block index between two selected resource block indexes among resource blocks included in a carrier bandwidth part as a set of resource blocks to which PDSCHs are mapped. The second resource assignment method may be a method for indicating continuous RBG indexes as a set of resource blocks to which PDSCHs are mapped. The second resource assignment method may be a method for indicating an RBG corresponding to an RBG index between two selected RBG indexes among RBGs included in a carrier bandwidth part as a set of resource blocks to which PDSCHs are mapped.

A single downlink grant is at least used for scheduling of a single PDSCH in a single serving cell. The downlink grant is at least used for the scheduling of the PDSCH in the same slot as the slot in which the downlink grant is transmitted.

A single uplink grant is at least used for scheduling of a single PUSCH in a single serving cell.

A single physical channel may be mapped to a single serving cell. A single physical channel may not be mapped to multiple serving cells.

The first DCI format may include a CBP indication information field. The CBP indication information field may at least indicate a carrier bandwidth part that is configured to an Active carrier bandwidth part. An active carrier bandwidth part for a downlink carrier is also referred to as a Downlink active carrier bandwidth part. An active carrier bandwidth part for an uplink carrier is also referred to as an Uplink active carrier bandwidth part. The terminal apparatus 1 can at least receive the PDCCH and the PDSCH in the downlink active carrier bandwidth part. In addition, the terminal apparatus 1 can at least receive the PUCCH and the PUSCH in the uplink active carrier bandwidth part. Additionally, the PDCCH and the PDSCH may not be received in a carrier bandwidth part other than the downlink active carrier bandwidth part. Moreover, the PUCCH and PUSCH may not be transmitted in a carrier bandwidth part other than the uplink active carrier bandwidth part.

A first DCI format used for scheduling of the PDSCH is also referred to as a first downlink DCI format. A first DCI format used for scheduling of the PUSCH is also referred to as a first uplink DCI format. The first downlink DCI format and the first uplink DCI format are also referred to as a first DCI format.

FIG. 5 is a diagram illustrating an example of a CBP indication information field according to an aspect of the present embodiment. In FIG. 5, the size of the CBP indication information field is two bits. As shown in FIG. 5, carrier bandwidth parts may respectively correspond to code points of information bits to which the CBP indication information field is mapped. The size of the CBG indication information field may be 1 bit, 3 bits, or another number of bits.

The number of downlink active carrier bandwidth parts for a given downlink carrier may be one. The number of uplink active carrier bandwidth parts for a given uplink carrier may be one.

There may be multiple downlink active carrier bandwidth parts for a given downlink carrier. There may be multiple uplink active carrier bandwidth parts for a given uplink carrier.

In a Frequency Division Duplex (FDD) mode, a downlink active carrier bandwidth part and an uplink active carrier bandwidth part may not correspond to each other. In a Time Division Duplex (TDD) mode, a downlink active carrier bandwidth part and an uplink active carrier bandwidth part may correspond to each other. The correspondence of a downlink active carrier bandwidth part to an uplink active carrier bandwidth part may mean that the center frequency of the downlink active carrier bandwidth part matches the center frequency of the uplink active carrier bandwidth part. The correspondence of the downlink active carrier bandwidth part to the uplink active carrier bandwidth part may mean that the carrier frequencies (e.g., a minimum carrier frequency and a maximum carrier frequency) that can be configured for the downlink active carrier bandwidth part match the carrier frequencies (e.g., a minimum carrier frequency and a maximum carrier frequency) that can be configured for the uplink active carrier bandwidth part. The correspondence of the downlink active carrier bandwidth part to the uplink active carrier bandwidth part may mean that the resource offset value $N_{offset\_CBP}$ associated with the downlink active carrier bandwidth part matches the resource offset value $N_{offset\_CBP}$ associated with the uplink active carrier bandwidth part. The correspondence of the downlink active carrier bandwidth part to the uplink active carrier bandwidth part may mean that the range of resource block indices available for the downlink active carrier bandwidth part matches the range of resource block indices available for the uplink active carrier bandwidth part. In a case that the downlink active carrier bandwidth part corresponds to the uplink active carrier bandwidth part, the CBP indication information field may indicate both a configuration of the downlink active carrier bandwidth part and a configuration of the uplink active carrier bandwidth part.

The CBP indication information field may at least indicate a downlink carrier bandwidth part configured in the downlink active carrier bandwidth part. A PDSCH scheduled by the DCI format including the CBP indication information field may be received in the downlink carrier bandwidth part. The CBP indication information field may at least indicate the downlink carrier bandwidth part in which the PDSCH scheduled by the DCI format including the CBP indication information field is received. The CBP indication information field may include at least information indicating the uplink carrier bandwidth part in which the PUSCH scheduled by the DCI format including the CBP indication information field is transmitted.

The second DCI format may not include the CBP indication information field.

The second DCI format used for scheduling of the PDSCH is also referred to as a second downlink DCI format. The second DCI format used for scheduling of the PUSCH is also referred to as a second uplink DCI format. The second downlink DCI format and the second uplink DCI format are also referred to as a second DCI format.

In the terminal apparatus 1, one or multiple control resource sets (CORESETs) may be configured to search for a PDCCH. The terminal apparatus 1 attempts to receive a PDCCH in one or multiple control resource sets.

The control resource set may indicate a time-frequency domain to which one or multiple PDCCHs can be mapped. The control resource set may be a region in which the terminal apparatus 1 attempts to receive the PDCCH. The control resource set may include continuous resources (Localized resources). The control resource set may include non-continuous resources (distributed resources).

In the frequency domain, the unit of mapping the control resource set may use a resource block. In the frequency domain, for example, the unit of mapping the control resource set may be six resource blocks. In the time domain, the unit of mapping the control resource set may use an OFDM symbol. In the time domain, for example, the unit of mapping the control resource set may be one OFDM symbol.

The frequency domain of control resource sets may be identical to the system bandwidth of a serving cell. In addition, the frequency domain of the control resource sets may be given at least based on the system bandwidth of the serving cell. The frequency domain of the control resource sets may be given at least based on higher layer signaling and/or downlink control information.

The time domain of the control resource sets may be given at least based on higher layer signaling and/or downlink control information.

A certain control resource set may be a Common control resource set. The common control resource set may be a control resource set configured commonly to multiple terminal apparatuses 1. The common control resource set may be given at least based on some or all of an MIB, first system information, second system information, common RRC signaling, and a cell ID. For example, the time resource and/or the frequency resource of the control resource set configured to monitor the PDCCH to be used for scheduling of the first system information may be given at least based on the MIB.

A certain control resource set may be a Dedicated control resource set. The dedicated control resource set may be a control resource set configured to be used exclusively for the terminal apparatus 1. The dedicated control resource set may be given at least based on dedicated RRC signaling and some or all of values of C-RNTI.

The control resource set may include a set of PDCCHs (or PDCCH candidates) to be monitored by the terminal apparatus 1. The control resource set may be configured to include one or multiple Search Spaces (SSs).

A certain search space is configured to include one or multiple PDCCH candidates of a certain Aggregation level. The terminal apparatus 1 receives a PDCCH candidate included in the search space and attempts to receive a PDCCH. Here, the PDCCH candidate is also referred to as a blind detection candidate.

A set of search spaces may include one or multiple search spaces. A set of certain search spaces may be Common Search Spaces (CSSs). A CSS may be given at least based on some or all of an MIB, the first system information, the second system information, the common RRC signaling, and the cell ID. The CSS may be configured for monitoring of the second DCI format. Monitoring of the first DCI format in the CSS may not be configured. The CSS may correspond to the second DCI format.

A set of certain search spaces may be a UE-specific Search Space (USS). The USS may be given at least based on dedicated RRC signaling and some or all of values of C-RNTI. The USS may be configured for monitoring the first DCI format and/or the second DCI format. The USS may correspond to the first DCI format and/or the second DCI format.

The common control resource set may include at least one or both of the CSS and the USS. The dedicated control resource set may include at least one or both of the CSS and the USS.

A physical resource of the search space includes a Control Channel Element (CCE) of the control channel. The CCE includes a predetermined number of Resource Element Groups (REGs). For example, the CCE may include six REGs. The REG may include one OFDM symbol in one Physical Resource Block (PRB). In other words, the REG may include 12 Resource Elements (REs). The PRB is also simply referred to as a Resource Block (RB).

The PDSCH is used to transmit downlink data (DL-SCH, PDSCH). The PDSCH is at least used to transmit a random access message 2 (random access response). The PDSCH is at least used to transmit system information including parameters used for initial access.

A PDSCH is given at least based on some or all of Scrambling, Modulation, layer mapping, precoding, and Mapping to physical resources. The terminal apparatus 1 may assume that the PDSCH is given at least based on some or all of scrambling, modulation, layer mapping, precoding, and mapping to physical resources.

In the scrambling, for codeword q, a bit block $b^{(q)}(i)$ may be scrambled at least based on a scrambling sequence $c^{(q)}(i)$ to generate $b^{(q)}{}_{sc}(i)$. In the bit block $b^{(q)}(i)$, i represents a value ranging from 0 to $M^{(q)}{}_{bit}-1$. $M^{(q)}{}_{bit}$ may be the number of bits of the codeword q transmitted on a PDSCH. The scrambling sequence $c^{(q)}(i)$ may be a sequence given at least based on a pseudo-random function (e.g., an M sequence, a Gold sequence, or the like). In the scrambling, for the codeword q, the bit block $b^{(q)}(i)$ may be scrambled based on the scrambling sequence $c^{(q)}(i)$ and the following Equation 1 to generate a scrambled bit block $b^{(q)}{}_{sc}(i)$.

$$b_{sc}^{(q)}(i) = \mathrm{mod}(b^{(q)}(i) + c^{(q)}(i), 2) \qquad \text{Equation 1}$$

mod (A, B) may be a function of outputting the remainder of A divided by B. mod (A, B) may be a function of outputting the value corresponding to the remainder of A divided by B.

In the modulation, for the codeword q, the scrambled bit block $b^{(q)}{}_{sc}(i)$ may be modulated based on a predetermined modulation scheme to generate a block $d^{(q)}(i)$ of a complex-valued modulation symbol. A predetermined modulation scheme may at least include some or all of Quadrature Phase Shift Keying (QPSK), 16 Quadrature Amplitude Modulation (QAM), 64QAM, and 256QAM. Note that the predetermined modulation scheme may be given at least based on DCI for scheduling the PDSCH.

In layer mapping, the block $d^{(q)}(i)$ of the complex-valued modulation symbol for each codeword may be mapped to one or multiple layers based on a predetermined mapping procedure to generate a block x(i) of a complex-valued modulation symbol. The block x(i) of the complex-valued modulation symbol is $x(i)=[x^{(0)}(i) \ldots x^{(v-1)}(i)]$. Here, v is the number of layers for a PDSCH.

In the precoding, a block x(i) of a complex-valued modulation symbol may be precoded. In the precoding, the block x(i) of the complex-valued modulation symbol may be converted into a block x(i) of the complex-valued modulation symbol for v antenna ports. The number of antenna ports for a PDSCH and the number of layers for a PDSCH may be the same.

In the mapping to physical resources (physical resource mapping), a block $x^{(p)}(i)$ of a complex-valued modulation symbol for an antenna port μ may be mapped to a resource element (k, l) of a resource block allocated for the PDSCH in a frequency-first manner, excluding resource elements that satisfy at least some or all of the following elements A to E. Here, the mapping in the frequency-first manner may be mapping such that the resource elements (k, l) are allocated sequentially from k to k+M (M is a predetermined value) for a symbol l, from k to k+M for a symbol l+1, . . . , and from k to k+M for a symbol l+N (N is a predetermined value). In the mapping to physical resources, a block $x^{(p)}(i)$ of a complex-valued modulation symbol for an antenna port p may be mapped to a resource element (k, l) in a time-first manner, excluding resource elements that satisfy at least some or all of the following elements A to E. Here, the mapping in the time-first manner may be mapping such that the resource elements (k, l) are allocated sequentially from a symbol l to a symbol l+N (N is a predetermined value) for a subcarrier index (resource element index) k, from a symbol l to a symbol l+N for a subcarrier index k+1, . . . , and from a symbol l to a symbol l+N for a subcarrier index k+M (M is a predetermined value). Element A) A resource element to which a DL DMRS associated with a PDSCH is mapped Element B) A resource element to which a DL PTRS associated with the DL DMRS is mapped Element C) A resource element in which a CSI-RS is configured and/or the CSI-RS is transmitted Element D) A resource element in which an SS block is configured and/or the SS block is transmitted Element E) A reserved resource A resource block allocated for the PDSCH (a resource block to which the PDSCH is mapped) is given at least based on a resource assignment information field included in the DCI format. Details of the resource block indicated by the resource assignment information field is described below.

In FIG. 1, the following downlink physical signals are used for the downlink radio communication. The downlink physical signals may not be used for transmitting information output from a higher layer, but is used by the physical layer.

Synchronization signal (SS)
DownLink DeModulation Reference Signal (DL DMRS)
Shared Reference Signal (Shared RS)
Channel State Information-Reference Signal (CSI-RS)
DownLink Phrase Tracking Reference Signal (DL PTRS)
Tracking Reference Signal (TRS)

The synchronization signal is used for the terminal apparatus 1 to establish synchronization in a frequency domain and a time domain in the downlink. The synchronization signal includes a Primary Synchronization Signal (PSS) and a Second Synchronization Signal (SSS).

An SS block (SS/PBCH block) is configured to include at least some or all of the PSS, the SSS, and the PBCH. Respective antenna ports of some or all of the PSS, SSS, and PBCH included in the SS block may be the same. Some or all of the PSS, SSS, and PBCH included in the SS block may be mapped to continuous OFDM symbols. Respective CP configurations of some or all of the PSS, SSS, and PBCH included in the SS block may be the same. Respective subcarrier spacing configurations 1 of some or all of the PSS, SSS, and PBCH included in the SS block may be the same.

The DL DMRS is associated with transmission of the PBCH, PDCCH and/or PDSCH. The DL DMRS is multiplexed with the PBCH, PDCCH or PDSCH. The terminal apparatuses 1 may use the DL DMRS corresponding to the PBCH, PDCCH, or PDSCH in order to perform channel compensation of the PBCH, PDCCH or PDSCH. Hereinafter, transmission of both of the PBCH and the DL DMRS associated with the PBCH is simply referred to as transmission of the PBCH. Hereinafter, transmission of both of the PDCCH and the DL DMRS associated with the PDCCH is simply referred to as transmission of the PDCCH. Hereinafter, transmission of both of the PDSCH and the DL DMRS associated with the PDSCH is simply referred to as transmission of the PDSCH. The DL DMRS associated with the PBCH is also referred to as a DL DMRS for the PBCH. The DL DMRS associated with the PDSCH is also referred to as a DL DMRS for the PDSCH. The DL DMRS associated with the PDCCH is also referred to as a DL DMRS associated with the PDCCH.

The Shared RS may be associated with at least transmission of the PDCCH. The Shared RS may be multiplexed with the PDCCH. The terminal apparatus 1 may use the Shared RS to perform channel compensation of the PDCCH. Hereinafter, transmission of both of the PDCCH and the Shared RS associated with the PDCCH is also simply referred to as transmission of the PDCCH.

The DL DMRS may be a reference signal individually configured for the terminal apparatus 1. The sequence of the DL DMRS may be given at least based on a parameter individually configured for the terminal apparatus 1. The sequence of the DL DMRS may be given at least based on a UE specific value (e.g., C-RNTI, or the like). The DL DMRS may be individually transmitted for the PDCCH and/or the PDSCH. On the other hand, the Shared RS may be a reference signal commonly configured for multiple terminal apparatuses 1. The sequence of the Shared RS may be given regardless of the parameter individually configured for the terminal apparatus 1. For example, the sequence of the Shared RS may be given based on at least some of a slot number, a mini-slot number, and a cell identity (ID). The Shared RS may be a reference signal to be transmitted regardless of whether the PDCCH and/or the PDSCH is transmitted.

The CSI-RS may be a signal at least used to calculate channel state information. A pattern of the CSI-RS assumed by the terminal apparatus may be given by at least a higher layer parameter.

The PTRS may be a signal to be at least used to compensate for phase noise. A pattern of the PTRS assumed by the terminal apparatus may be given at least based on a higher layer parameter and/or DCI.

The DL PTRS may be associated with a DL DMRS group that includes at least an antenna port used for one or multiple DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port of the lowest index of antenna ports for the DL DMRS included in the DL DMRS group.

The TRS may be a signal to be at least used for time and/or frequency synchronization. A pattern of the TRS assumed by the terminal apparatus may be given at least based on a higher layer parameter and/or DCI.

Downlink physical channels and downlink physical signals are collectively referred to as downlink signals. Uplink physical channels and uplink physical signals are collectively referred to as uplink signals. The downlink signals and the uplink physical signals are collectively referred to as physical signals. The downlink signal and the uplink signal are collectively referred to as signals. The downlink physical channels and the uplink physical channels are collectively referred to as physical channels. The downlink physical signals and the uplink physical signals are collectively referred to as physical signals.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or an MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 exchange (transmit and/or receive) higher layer signaling in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A serving cell-specific higher layer parameter may be transmitted by using the signaling common to the multiple terminal apparatuses 1 in the serving cell or the signaling dedicated to a certain terminal apparatus 1. A UE-specific higher layer parameter may be transmitted by using the signaling dedicated to the certain terminal apparatus 1. The PDSCH including the dedicated RRC signaling may be scheduled via the PDCCH in the first control resource set.

A Broadcast Control CHannel (BCCH), a Common Control CHannel (CCCH), and a Dedicated Control CHannel (DCCH) are logical channels. For example, the BCCH is a higher layer channel used to transmit the MIB. Furthermore, the Common Control CHannel (CCCH) is a higher layer channel used to transmit information common to the multiple terminal apparatuses 1. Here, the CCCH is used for a terminal apparatus 1 that is not in an RRC connected state, for example. Furthermore, the Dedicated Control CHannel (DCCH) is a higher layer channel at least used to transmit control information dedicated to the terminal apparatus 1 (dedicated control information). Here, the DCCH is used for a terminal apparatus 1 that is in an RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

An example of an initial connection method according to an aspect of the present embodiment will be described below.

Figure 6:
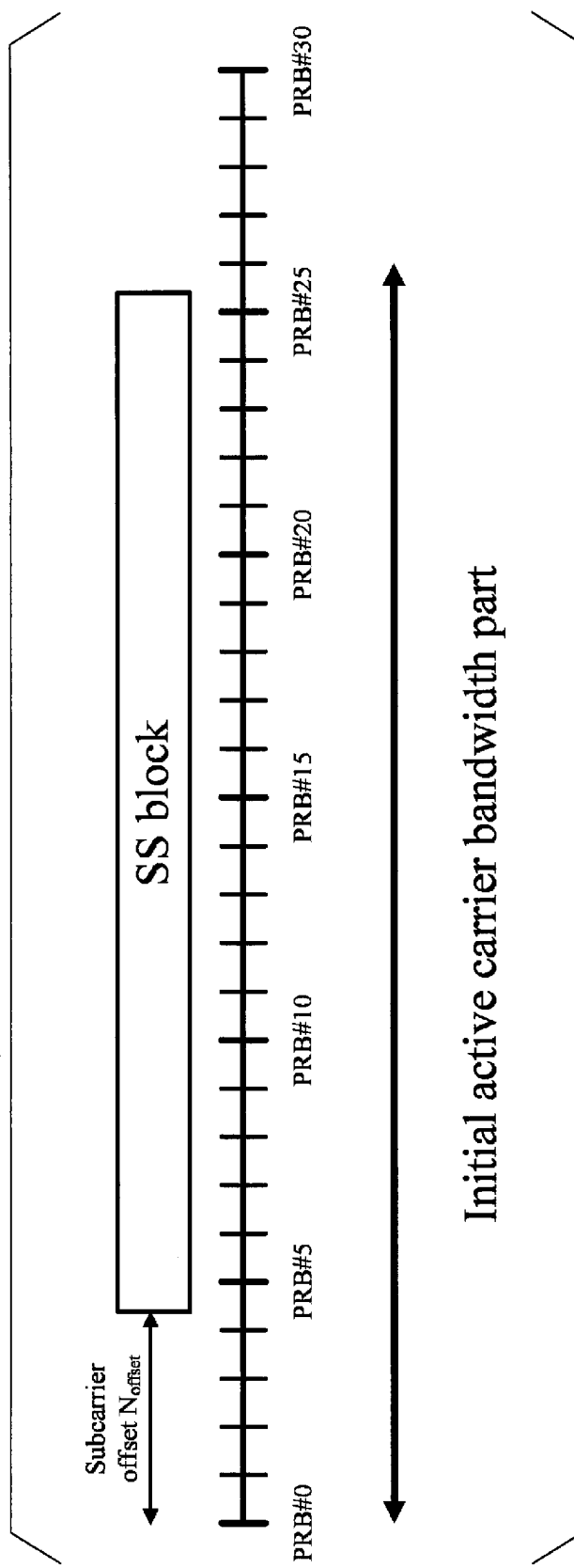
FIG. 6 is a diagram illustrating an example of mapping of an SS block according to an aspect of the present embodiment.

FIG. 6 is a diagram illustrating an example of mapping of an SS block according to an aspect of the present embodiment. In FIG. 6, the horizontal axis indicates an index of a resource block in the frequency domain. The index of the resource block in the frequency domain is simply referred to as a resource block index. As shown in FIG. 6, the SS block in the frequency domain is mapped with an offset of the number of subcarriers $N_{offset}$ from a reference point of the resource block index (e.g., resource block #0). $N_{offset}$ may be configured to 0. $N_{offset}$ may be configured to a value other than 0. $N_{offset}$ is also referred to as a subcarrier offset. $N_{offset}$ may be given based on the information field of MIB included in the PBCH included in the SS block. Moreover, a range of a predetermined number of resource blocks from a reference point of a resource block index may be configured to a Downlink initial active carrier bandwidth part in the frequency domain. In FIG. 6, the downlink initial active carrier bandwidth part in the frequency domain is configured from a resource block #0 to a resource block #26.

The subcarrier offset $N_{offset}$ may be given at least based on a resource grid offset $N_{offset\_RB\_grid}$ and/or a resource block index offset $N_{offset\_RB\_index}$. The resource grid offset $N_{offset\_RB\_grid}$ may indicate, in the frequency domain, the value of the first subcarrier index in the first resource block to which the SS block is mapped. The resource grid offset $N_{offset\_RB\_grid}$ may indicate, on a subcarrier unit basis, a shift between the SS block and the resource grid. The resource block index offset $N_{offset}$_RB_index may indicate, in the frequency domain, a shift between a reference point of a resource block index and a first resource block to which the SS block is mapped. The resource grid offset $N_{offset\_RB\_grid}$ may be given based on the information field of the MIB included in the PBCH included in the SS block. The resource block index offset $N_{offset\_RB\_index}$ may be given based on the information field of the MIB included in the PBCH included in the SS block.

The downlink initial active carrier bandwidth part may be given at least based on the band of a control resource set given at least based on the MIB. The band of the downlink initial active carrier bandwidth part may be the same as the band of the control resource set given at least based on the MIB.

The terminal apparatus 1 may identify the downlink initial active carrier bandwidth part at least based on the subcarrier offset $N_{offset}$ included in the PBCH included in the SS block and/or the mapping of the SS block. The terminal apparatus 1 may configure the downlink initial active carrier bandwidth part in the downlink active carrier bandwidth part, and monitor the PDCCH in the downlink initial active carrier bandwidth part. The PDCCH may be at least used for scheduling of the first system information. A CRC sequence added to the PDCCH may be scrambled at least based on a System Information-Radio Network Temporary Identifier (SI-RNTI).

The terminal apparatus 1 transmits a PRACH in an uplink active carrier bandwidth part. The first system information may include information indicating a physical resource for transmitting the PRACH in the uplink. In addition, the first system information may include information indicating an Uplink initial active carrier bandwidth part in the frequency domain. The downlink initial active carrier bandwidth part and the uplink initial active carrier bandwidth part are also referred to as an initial active carrier bandwidth part. In a case that the PRACH is transmitted, the uplink initial activated active carrier bandwidth part may be configured for the uplink active carrier bandwidth part.

The terminal apparatus 1 can configure the First downlink carrier bandwidth part to the downlink active carrier bandwidth part and monitor the PDCCH. The PDCCH may be a PDCCH for scheduling a random access response (message 2 PDSCH). The CRC sequence added to the PDCCH may be scrambled with a Random Access-Radio Network Temporary Identifier (RA-RNTI). The RA-RNTI may be given at least based on a time index of the SS block. A random access response including a random access response grant is transmitted. The random access response grant included in the random access response grant MAC CE is transmitted. The message 2 PDSCH may include the random access response grant MAC CE.

A first downlink carrier bandwidth part may be given at least based on the first system information. In a case that information associated with the first downlink carrier bandwidth part is not included in the first system information, the first downlink carrier bandwidth part may be a downlink initial active carrier bandwidth part. In the case that information associated with the first downlink carrier bandwidth part is not included in the first system information, the terminal apparatus 1 may not change the configuration of the downlink active carrier bandwidth part.

The terminal apparatus 1 transmits a message 3 PUSCH at least based on the random access response grant. The message 3 PUSCH may include an RRC connection request.

The terminal apparatus 1 can monitor a PDCCH in the first downlink carrier bandwidth part. The PDCCH may be used for scheduling of a message 4 PDSCH. The message 4 PDSCH may include a Contention resolution MAC CE.

Hereinafter, the Carrier Bandwidth part adaptation in the terminal apparatus 1 will be described. The Carrier Bandwidth part adaptation includes an operation of changing the configuration of the active carrier bandwidth part. The Carrier Bandwidth part adaptation may include at least a change of the configuration of an RF unit 32 and/or a change of the configuration of a baseband unit 33.

The terminal apparatus 1 may configure one Downlink default carrier bandwidth part at least based on the dedicated RRC signaling. In a case that the dedicated RRC signaling indicating the downlink default carrier bandwidth part is not received, the downlink initial active carrier bandwidth part may be configured to a downlink default carrier bandwidth part. In a case that the dedicated RRC signaling at least including information indicating the downlink default carrier bandwidth part is not received and information indicating the first downlink carrier bandwidth part is not included in the first system information, the downlink initial active carrier bandwidth part may be configured to a downlink default carrier bandwidth part. In a case that the dedicated RRC signaling at least including information indicating the downlink default carrier bandwidth part is not received and information indicating the first downlink carrier bandwidth part is included in the first system information, the first downlink carrier bandwidth part may be configured to a downlink default carrier bandwidth part.

In the terminal apparatus 1, one or multiple downlink carrier bandwidth parts may be configured at least based on the dedicated RRC signaling. In addition, the terminal apparatus 1 may configure one or multiple downlink carrier bandwidth parts for one serving cell at least based on the dedicated RRC signaling.

Figure 7:
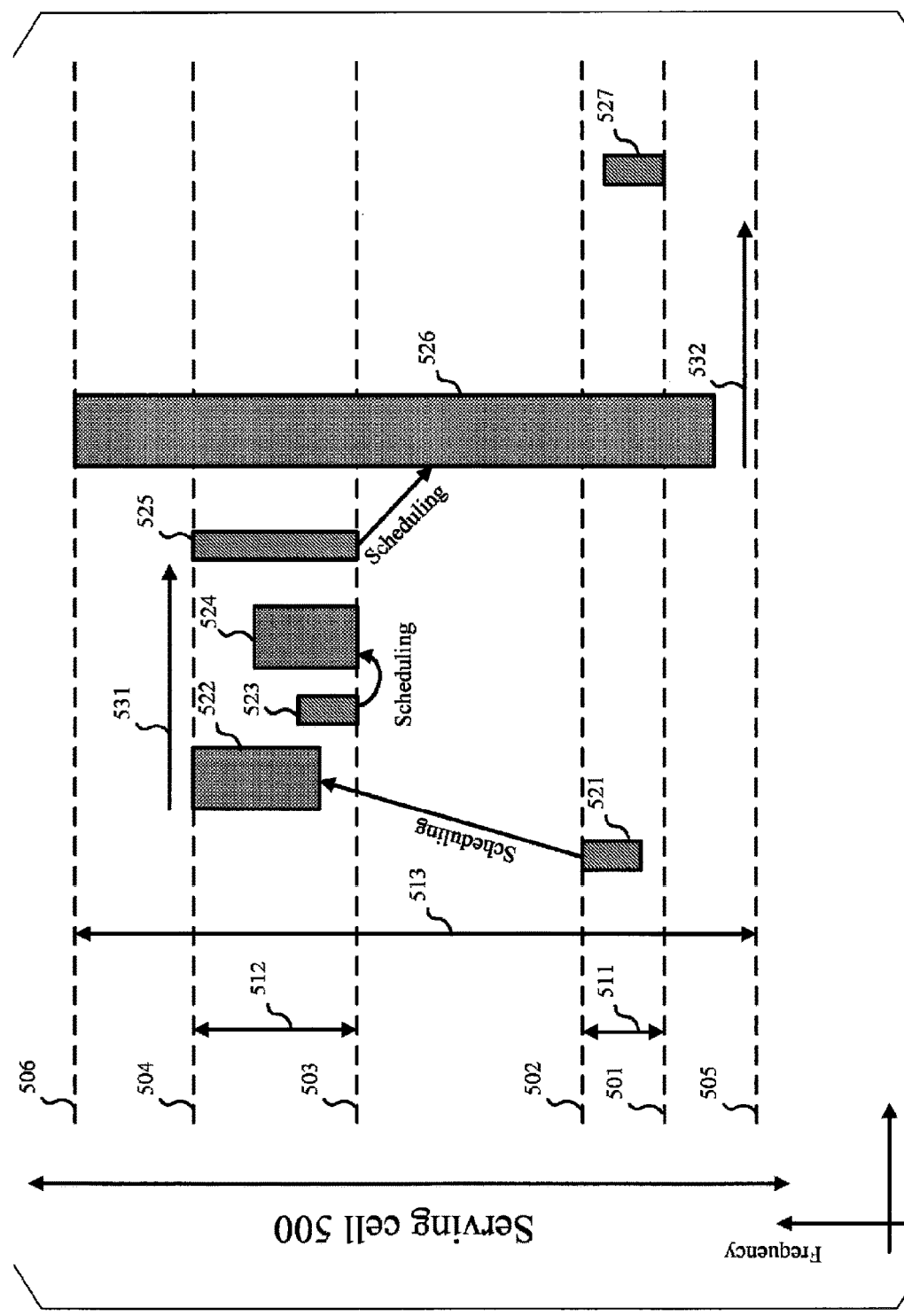
FIG. 7 is a diagram illustrating an example of carrier bandwidth part adaptation according to an aspect of the present embodiment.

FIG. 7 is a diagram illustrating an example of carrier bandwidth part adaptation according to an aspect of the present embodiment. In one example shown in FIG. 7, carrier bandwidth parts 511, 512, and 513 are configured in a serving cell 500. In addition, the carrier bandwidth part 511 is given in the frequency band between a resource block index 501 and a resource block index 502. In addition, the carrier bandwidth part 512 is given in the frequency band between a resource block index 503 and a resource block index 504. In addition, the carrier bandwidth part 513 is given in the frequency band between a resource block index 505 and a resource block index 506. Here, the carrier bandwidth part 511 is configured to a downlink default carrier bandwidth part.

In FIG. 7, the terminal apparatus 1 receives a PDCCH 521 in the carrier bandwidth part 511 configured to a downlink active carrier bandwidth part. Next, the terminal apparatus 1 configures the carrier bandwidth part 512 to a downlink active carrier bandwidth part at least based on the CBP indication information field included in the DCI format included in the PDCCH 521. Next, the terminal apparatus 1 receives a PDSCH 522 in the carrier bandwidth part 512. Here, the DCI format included in the PDCCH 521 may be a first DCI format.

The terminal apparatus 1 changes the configuration of the downlink active carrier bandwidth part from the carrier bandwidth part 511 to the carrier bandwidth part 512 during a period of time from the reception of the PDSCH 521 to the reception of the PDCCH 522.

In a case that the terminal apparatus 1 configures the carrier bandwidth part 512 to a downlink active carrier bandwidth part, a timer 531 starts. In a case that the timer 531 expires without receiving a PDCCH for scheduling a PDSCH in the carrier bandwidth part 512, the terminal apparatus 1 may configure a downlink default carrier bandwidth part to a downlink active carrier bandwidth part.

Next, the terminal apparatus 1 receives a PDCCH 523 and a PDSCH 524 in the carrier bandwidth part 512. In a case that the PDSCH (here, the PDSCH 524) has been received in the downlink active carrier bandwidth part, the timer 531 may restart.

Next, the terminal apparatus 1 receives a PDCCH 525 in the carrier bandwidth part 512, and changes the configuration of the downlink active carrier bandwidth part from the carrier bandwidth part 512 to the carrier bandwidth part 513 at least based on the CBP indication information field included in the DCI format included in the PDCCH 525. Next, the terminal apparatus 1 receives a PDSCH 526 in the carrier bandwidth part 513. Here, the DCI format included in the PDCCH5 525 may be the first DCI format.

In a case that the terminal apparatus 1 configures the carrier bandwidth part 513 to a downlink active carrier bandwidth part, a timer 532 starts. In a case that the timer 532 expires without receiving a PDCCH for scheduling a PDSCH in the carrier bandwidth part 513, the terminal apparatus 1 may change the downlink default carrier bandwidth part to a downlink active carrier bandwidth part.

In a case that the timer 532 expires, the terminal apparatus 1 configures the downlink default carrier bandwidth part to a downlink active carrier bandwidth part. Next, the terminal apparatus 1 receives a PDCCH 527 in the carrier bandwidth part 511 configured to a downlink default carrier bandwidth part.

The timer 531 and the timer 532 are timers that determine whether the terminal apparatus 1 changes the configuration of the downlink active carrier bandwidth part to the downlink default carrier bandwidth part. Hereinafter, the timer 531 and the timer 532 are simply referred to as timer. Whether to configure the downlink default carrier bandwidth part as a downlink active carrier bandwidth part may be given at least based on the timer.

Figure 8:
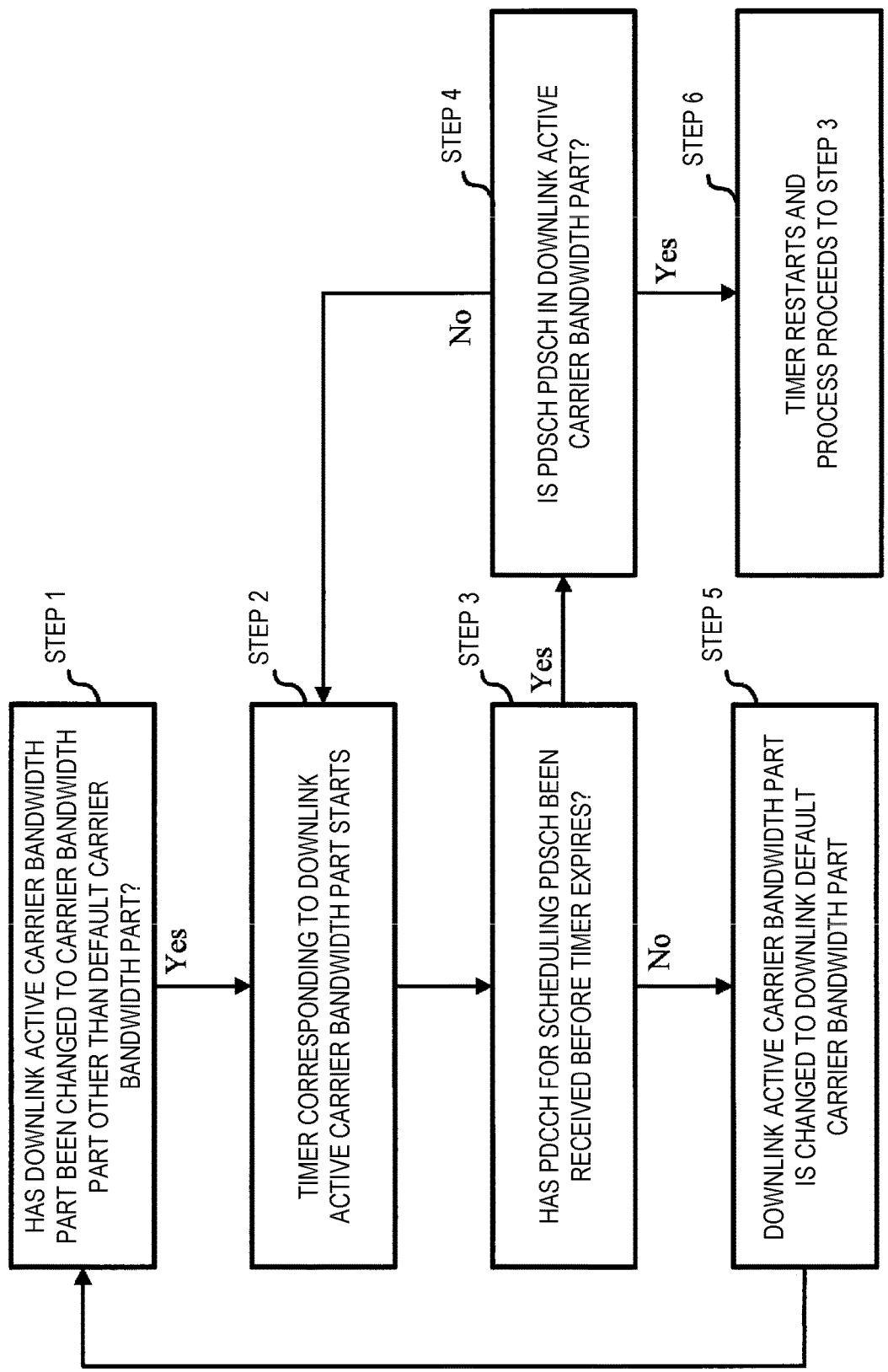
FIG. 8 is a diagram illustrating an operation example of a timer according to an aspect of the present embodiment.

FIG. 8 is a diagram illustrating an operation example of the timer according to an aspect of the present embodiment. In FIG. 8, the downlink default carrier bandwidth part may be the carrier bandwidth part 511, and a downlink carrier bandwidth part other than the downlink carrier bandwidth part may be the carrier bandwidth part 512 or 513. First, in step 1, in a case that the carrier bandwidth part other than the downlink default carrier bandwidth part is configured to a downlink active carrier bandwidth part, a timer for a carrier bandwidth part other than the downlink default carrier bandwidth part starts (step 2). Here, the start of the timer may mean that a value of the timer is configured to an initial value. The initial value may be configured for each carrier bandwidth part. That is, the timer may be initialized by the initial value of the timer corresponding to the carrier bandwidth part configured to the downlink active carrier bandwidth part. The start of the timer may mean starting of a timer for a carrier bandwidth part and discarding of a timer for the carrier bandwidth part before the configuration of the downlink active carrier bandwidth part is changed to the carrier bandwidth part.

In step 3, in a case that the PDCCH for scheduling the PDSCH is received before the timer expires, the process proceeds to step 4. In step 3, in a case that the PDCCH for scheduling the PDSCH is not received before the timer expires, the process proceeds to step 5.

In step 4, in a case that the PDSCH scheduled by the received PDCCH is a PDSCH in the downlink active carrier bandwidth part, the timer restarts and the process proceeds to step 3. The restart of the timer may mean that a value of the timer started for the downlink active carrier bandwidth part is configured to an initial value.

In a step 4, in a case that the PDSCH scheduled by the received PDCCH is a PDSCH in the carrier bandwidth part other than the downlink active carrier bandwidth part, the process proceeds to step 2. In step 4, a carrier bandwidth part other than the downlink default carrier bandwidth part configured to the downlink active carrier bandwidth part may be indicated at least based on the CBP indication information field included in the DCI format included in the PDCCH.

In step 5, the downlink default carrier bandwidth part is configured to the downlink active carrier bandwidth part, and the process returns to step 1.

The downlink default carrier bandwidth part may be a carrier bandwidth part configured to the downlink active carrier bandwidth part in a case that the timer expires. In a case that the downlink default carrier bandwidth part is configured to the downlink active carrier bandwidth part, the timer may not start. The timer and the initial value of the timer may not be configured for the downlink default carrier bandwidth part. The timer and/or the initial value of the timer may be configured for (or associated with) each carrier bandwidth part that is not a downlink default carrier bandwidth part and is configured by the dedicated RRC signaling. The carrier bandwidth part that is not the downlink default carrier bandwidth part and is configured by the dedicated RRC signaling is also referred to as a second downlink carrier bandwidth part. In other words, the second downlink carrier bandwidth part is a generic term for the downlink initial active carrier bandwidth part, the first carrier bandwidth part, and the carrier bandwidth part other than the downlink default carrier bandwidth part.

The second downlink carrier bandwidth part includes at least the carrier bandwidth part 512 in the serving cell 500 and the carrier bandwidth part 513 in the serving cell 500.

In a case that the first downlink DCI format for the serving cell 500 is detected in a control resource set in the downlink default carrier bandwidth part in the serving cell 500, the carrier bandwidth part 512 in the serving cell 500 may be configured to the downlink active carrier bandwidth part at least based on the CBP indication information field included in the first downlink DCI format. The carrier bandwidth part 512 may be a carrier bandwidth part indicated by the CBP indication information field. A resource assignment information field included in the first downlink DCI format may indicate a set of resource blocks to which the PDSCH is mapped, among resource blocks included in the carrier bandwidth part 512 in the frequency domain. A size of the resource assignment information field included in the first downlink DCI format may be given at least based on the number of resource blocks included in the carrier bandwidth part 512 in the frequency domain. The size of the resource assignment information field may be configured to the maximum size among calculated sizes of the respective resource assignment information fields for one or multiple downlink carrier bandwidth parts in the serving cell 500. The size of the resource assignment information field may be configured based on the maximum number of RBGs included in each of the one or the multiple downlink carrier bandwidth parts in the serving cell in the frequency domain. In other words, $N_{RBG\_CBP}$ for calculating the size of the resource assignment information field may be the maximum value of the number of RBGs included in each of the one or the multiple downlink carrier bandwidth parts configured in the serving cell 500 in the frequency domain. The size of the resource assignment information field may be configured based on the maximum value of the number of resource blocks included in each of the one or the multiple downlink carrier bandwidth parts configured in the serving cell 500 in the frequency domain. In other words, $N_{RB\_CBP}$ for calculating the size of the resource assignment information field may be the maximum value of the number of resource blocks included in each of the one or the multiple downlink carrier bandwidth parts configured in the serving cell 500 in the frequency domain. The size of an RBG $N_{RBG}$ may be configured for each of the one or the multiple downlink carrier bandwidth parts. The size of the resource assignment information field included in the first downlink DCI format may be given at least based on the dedicated RRC signaling.

The size of the resource assignment information field included in the first DCI format may be given for each serving cell.

In the FDD mode, in a case that a first uplink DCI format for the serving cell 500 is detected in a control resource set in the downlink default carrier bandwidth part in the serving cell 500, the downlink active carrier bandwidth part may not be changed.

In the TDD mode, in a case that the first uplink DCI format for the serving cell 500 is detected in the control resource set in the downlink default carrier bandwidth part in the serving cell 500, the downlink active carrier bandwidth part may not be changed.

In a case that a second downlink DCI format for the serving cell 500 is detected in the control resource set in the downlink default carrier bandwidth part in the serving cell 500, resource assignment information included in the second downlink DCI format may indicate a set of resource blocks to which the PDSCH is mapped, among resource blocks included in the downlink default carrier bandwidth part in the frequency domain. The size of the resource assignment information field included in the second downlink DCI format may be given at least based on the number of resource blocks included in the downlink default carrier bandwidth part.

In the FDD mode, in a case that the second uplink DCI format for the serving cell 500 is detected in the control resource set in the downlink default carrier bandwidth part in the serving cell 500, the downlink active carrier bandwidth part may not be changed.

In the TDD mode, in a case that the second uplink DCI format for the serving cell 500 is detected in the control resource set in the downlink default carrier bandwidth part in the serving cell 500, the downlink active carrier bandwidth part may not be changed.

In a case that the first downlink DCI format for the serving cell 500 is detected in the control resource set in the carrier bandwidth part 512 in the serving cell 500, the carrier bandwidth part 513 in the serving cell 500 may be configured to the downlink active carrier bandwidth part at least based on the CBP indication information field included in the first downlink DCI format. The carrier bandwidth part 513 may be a carrier bandwidth part indicated by the CBP indication information field. The resource assignment information field included in the first downlink DCI format may indicate a set of resource blocks to which the PDSCH is mapped, among resource blocks included in the carrier bandwidth part 513 in the frequency domain. The size of the resource assignment information field included in the first downlink DCI format may be given at least based on the number of resource blocks included in the carrier bandwidth part 513 in the frequency domain. The size of the resource assignment information field may be configured to the maximum size among calculated sizes of the respective resource assignment information fields for one or multiple downlink carrier bandwidth parts in a certain serving cell. The size of the resource assignment information field may be configured based on the maximum number of RBGs included in each of the one or the multiple downlink carrier bandwidth parts in the certain serving cell in the frequency domain. In other words, $N_{RBG\_CBP}$ for calculating the size of the resource assignment information field may be the maximum value of the number of RBGs included in each of the one or the multiple downlink carrier bandwidth parts configured in the certain serving cell in the frequency domain. The size of the resource assignment information field may be configured based on the maximum value of the number of resource blocks included in each of the one or the multiple downlink carrier bandwidth parts configured in the certain serving cell in the frequency domain. In other words, $N_{RB\_CBP}$ for calculating the size of the resource assignment information field may be the maximum value of the number of resource blocks included in each of the one or the multiple downlink carrier bandwidth parts configured in the certain serving cell in the frequency domain. The size of an RBG $N_{RBG}$ may be configured for each of the one or the multiple downlink carrier bandwidth parts. The size of the resource assignment information field included in the first downlink DCI format may be given at least based on the dedicated RRC signaling.

In the FDD mode, in a case that the first uplink DCI format for the serving cell 500 is detected in the control resource set in the carrier bandwidth part 512 in the serving cell 500, the downlink active carrier bandwidth part may not be changed.

In the TDD mode, in a case that the first uplink DCI format for the serving cell 500 is detected in the control resource set in the carrier bandwidth part 512 in the serving cell 500, the downlink active carrier bandwidth part may not be changed.

In a case that the second downlink DCI format for the serving cell 500 is detected in the control resource set in the carrier bandwidth part 512 in the serving cell 500, the downlink default carrier bandwidth part may be configured to the downlink active carrier bandwidth part. The resource assignment information field included in the second downlink DCI format may indicate a set of resource blocks to which the PDSCH is mapped, among resource blocks included in the downlink default carrier bandwidth part. The size of the resource assignment information field included in the second downlink DCI format may be given at least based on the number of RBGs included in the downlink default carrier bandwidth part. The size of the resource assignment information field included in the second downlink DCI format may be given at least based on the number of resource blocks included in the downlink default carrier bandwidth part.

In the FDD mode, in a case that the second uplink DCI format for the serving cell 500 is detected in the control resource set in the carrier bandwidth part 512 in the serving cell 500, the downlink active carrier bandwidth part may not be changed.

In the TDD mode, in a case that the second uplink DCI format for the serving cell 500 is detected in the control resource set in the carrier bandwidth part 512 in the serving cell 500, the downlink active carrier bandwidth part may not be changed.

The number of resource blocks included in the downlink default carrier bandwidth part may be given at least based on the subcarrier spacing for the PDCCH and the PDSCH in the downlink default carrier bandwidth part and the bandwidth of the downlink default carrier bandwidth part. The subcarrier spacing for the PDCCH and the PDSCH in the downlink default carrier bandwidth part may be given at least based on the subcarrier spacing configuration for the downlink default carrier bandwidth part. The bandwidth of the downlink default carrier bandwidth part may be given at least based on some or all of the frequency/center frequency of the downlink default carrier bandwidth part, the band to which the downlink default carrier bandwidth part belongs, the common RRC signaling, and the dedicated RRC signaling.

The number of resource blocks included in the downlink default carrier bandwidth part may be the same as the subcarrier spacing for the PDCCH and the PDSCH in the downlink initial active carrier bandwidth part and the bandwidth of the downlink initial active carrier bandwidth part. The subcarrier spacing for the PDCCH and the PDSCH in the downlink default carrier bandwidth part may be the same as the subcarrier spacing configuration $\mu$ for the downlink initial active carrier bandwidth part. The bandwidth of the downlink default carrier bandwidth part may be given at least based on some or all of the frequency/center frequency of the downlink initial active carrier bandwidth part, the band to which the downlink initial active carrier bandwidth part belongs, the common RRC signaling, and the dedicated RRC signaling.

The resource assignment information field may identify resource blocks included in the carrier bandwidth part at least based on a resource offset value $N_{offset\_CBP}$ associated with the carrier bandwidth part. The resource offset value $N_{offset\_CBP}$ associated with the carrier bandwidth part indicates that a point with an offset of the resource offset value $N_{offset\_CBP}$ from the reference point of the resource block index is the reference point of the resource block index for the carrier bandwidth part.

The reference point of the resource block index may be equal to the reference point of the resource block index for the downlink initial active carrier bandwidth part. That is, the resource offset value $N_{offset\_CBP}$ associated with the downlink initial active carrier bandwidth part may be 0. The resource offset value $N_{offset\_CBP}$ associated with the first downlink carrier bandwidth part may be given at least based on the first system information. The resource offset value $N_{offset\_CBP}$ associated with the downlink default carrier bandwidth part may be given at least based on the dedicated RRC signaling. The resource offset value $N_{offset\_CBP}$ associated with the second downlink carrier bandwidth part may be given at least based on the dedicated RRC signaling.

Figure 9:
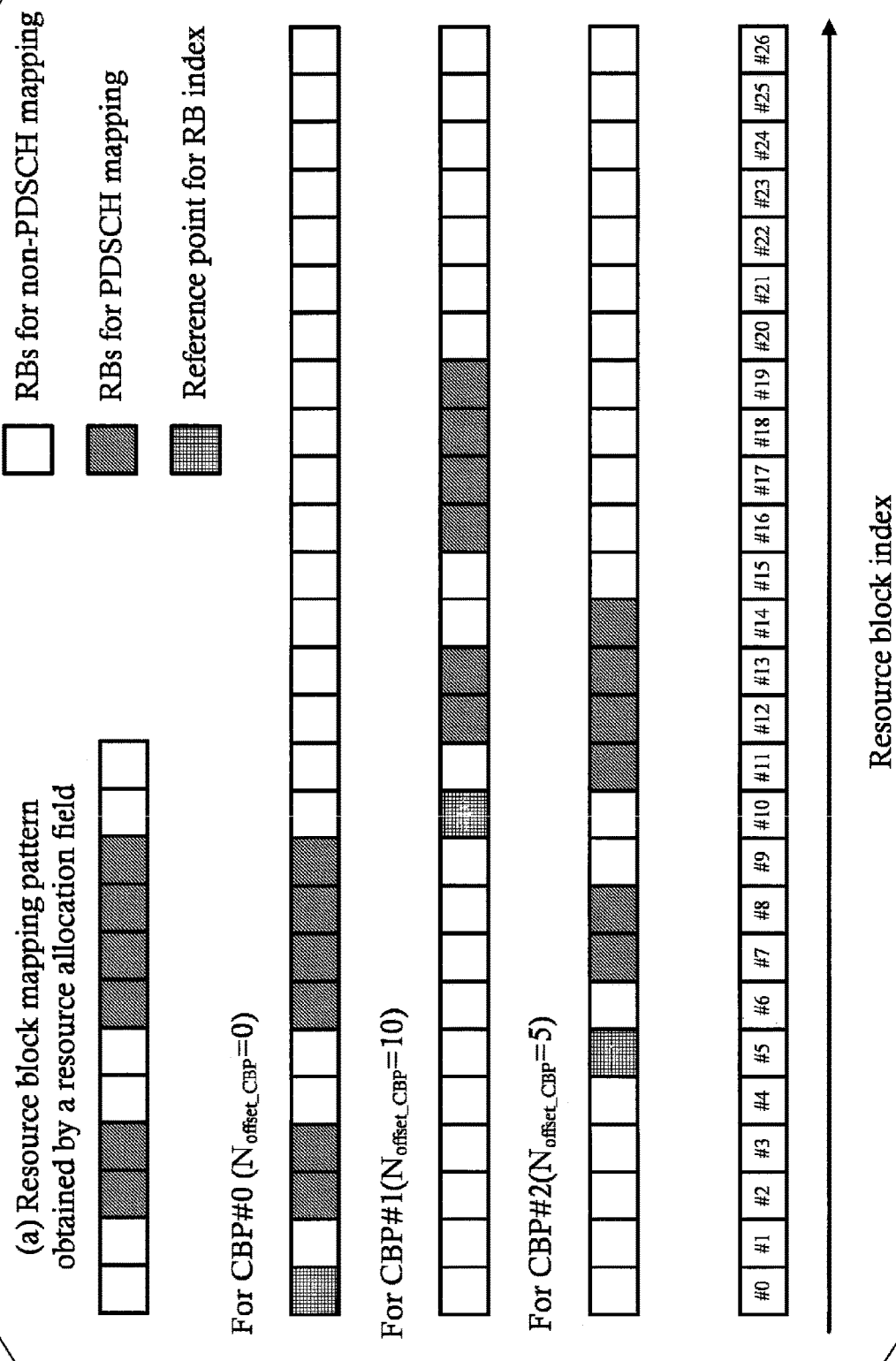
FIG. 9 is a diagram illustrating an example of a resource block allocation method according to an aspect of the present embodiment.

FIG. 9 is a diagram illustrating an example of a resource block allocation method according to an aspect of the present embodiment. In FIG. 9, it is assumed that the allocation pattern of resource blocks (Resource block mapping pattern) with which a PDSCH is mapped is given as illustrated in FIG. 9A, the allocation pattern being indicated by the resource assignment information field. In addition, it is assumed that the resource offset value $N_{offset\_CBP}$ associated with a carrier bandwidth part #0 (CBP #0) is 0. In addition, it is assumed that the resource offset value $N_{offset\_CBP}$ associated with a carrier bandwidth part #1 (CBP #1) is 10. In addition, it is assumed that the resource offset value $N_{offset\_CBP}$ associated with a carrier bandwidth part #2 (CBP #2) is 5. In addition, the reference point of the resource block index is a resource block #0.

In FIG. 9, the PDSCH is mapped to the resource blocks with diagonal lines. In addition, each of the resource blocks with lattice lines is a reference point of the resource block index associated with each carrier bandwidth part. Because the resource offset value $N_{offset\_CBP}$ associated with the carrier bandwidth part #0 is 0, the PDSCH is mapped to the PDSCH resource block indexes #2, #3, #6, #7, #8, and #9. Because the resource offset value $N_{offset\_CBP}$ associated with the carrier bandwidth part #1 is 10, the PDSCH is mapped to the PDSCH resource block indexes #12, #13, #16, #17, #18, and #19. Because the resource offset value $N_{offset\_CBP}$ associated with the carrier bandwidth part #2 is 5, the PDSCH is mapped to the PDSCH resource block indexes #7, #8, #11, #12, #13, and #14.

In other words, the set of resource blocks to which the PDSCH is mapped may be given at least based on the value of the resource assignment information field and the resource offset value $N_{offset\_CBP}$ associated with the carrier bandwidth part, the set of resource blocks being indicated by the resource assignment information field. Here, the carrier bandwidth part may be a carrier bandwidth part to which the PDSCH is mapped. The set of resource blocks to which the PDSCH is mapped may be given at least based on the value of the resource assignment information field and the resource offset value $N_{offset\_CBP}$ associated with the carrier bandwidth part to which the PDSCH is mapped, the set of resource blocks being indicated by the resource assignment information field.

The resource offset value $N_{offset\_CBP\_1}$ associated with the downlink carrier bandwidth part in a case that the first DCI format for the serving cell 500 is detected and the resource offset value $N_{offset\_CBP\_2}$ associated with the downlink carrier bandwidth part in a case that the second DCI format for the serving cell 500 is detected may be different. The resource offset value $N_{offset\_CBP\_1}$ and the resource offset value $N_{offset\_CBP\_2}$ may each be given at least based on the dedicated RRC signaling.

A configuration example of the terminal apparatus 1 according to the one aspect of the present embodiment will be described below.

Figure 10:
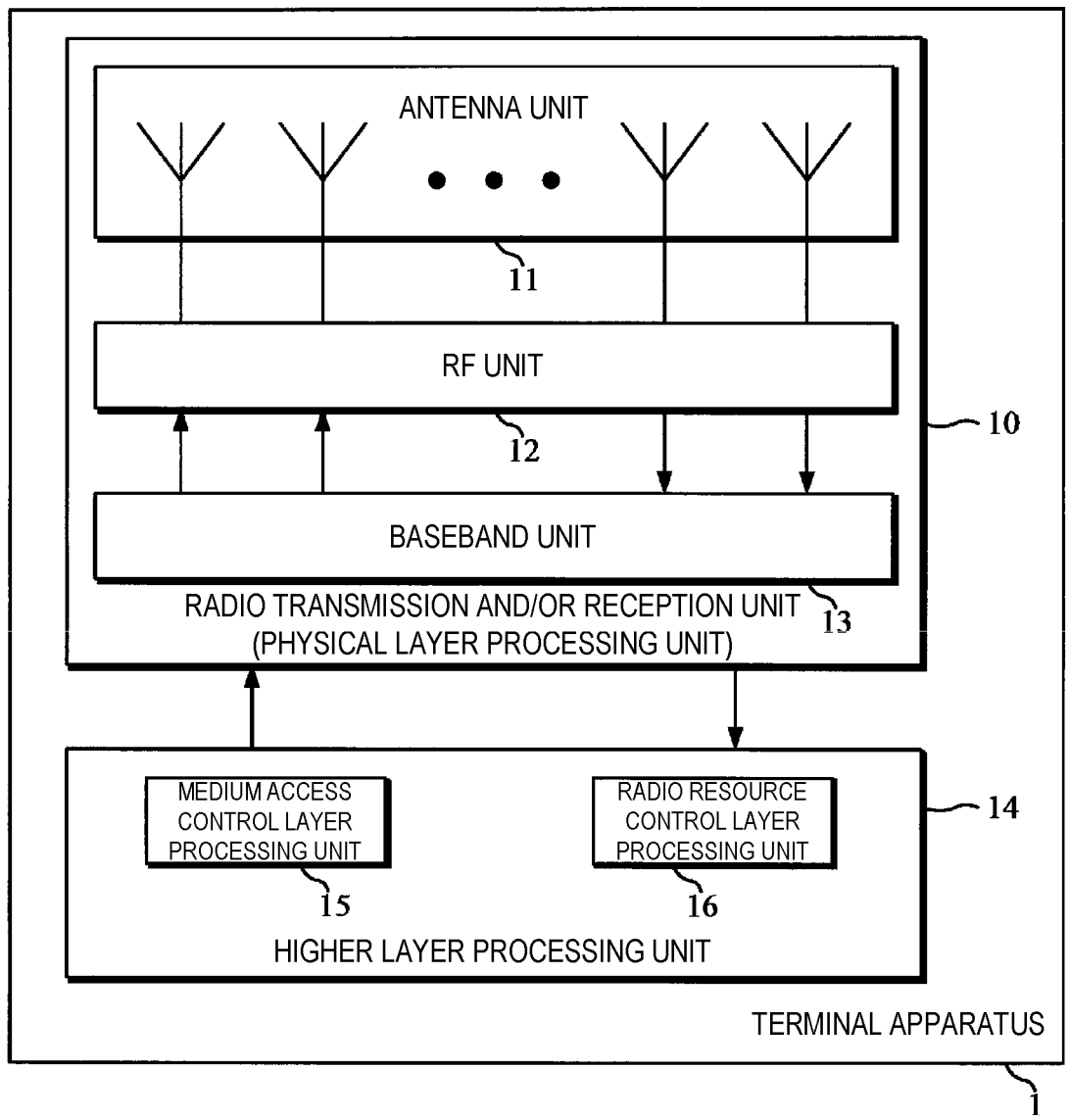
FIG. 10 is a schematic block diagram illustrating a configuration of a terminal apparatus 1 according to an embodiment of the present embodiment.

FIG. 10 is a schematic block diagram illustrating a configuration of the terminal apparatus 1 according to an aspect of the present embodiment. As illustrated, the terminal apparatus 1 is configured to include a radio transmission and/or reception unit 10 and a higher layer processing unit 14. The radio transmission and/or reception unit 10 is configured to include at least some or all of an antenna unit 11, a Radio Frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of an MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The parameters may be higher layer parameters.

The radio transmission and/or reception unit 10 performs processing of the physical layer, such as modulation, demodulation, coding, decoding, and the like. The radio transmission and/or reception unit 10 demultiplexes, demodulates, and decodes a received physical signal and outputs the decoded information to the higher layer processing unit 14. The radio transmission and/or reception unit 10 generates a physical signal by performing modulation and coding of data, and generating a baseband signal (conversion into a time continuous signal), and transmits the physical signal to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to one aspect of the present embodiment will be described below.

Figure 11:
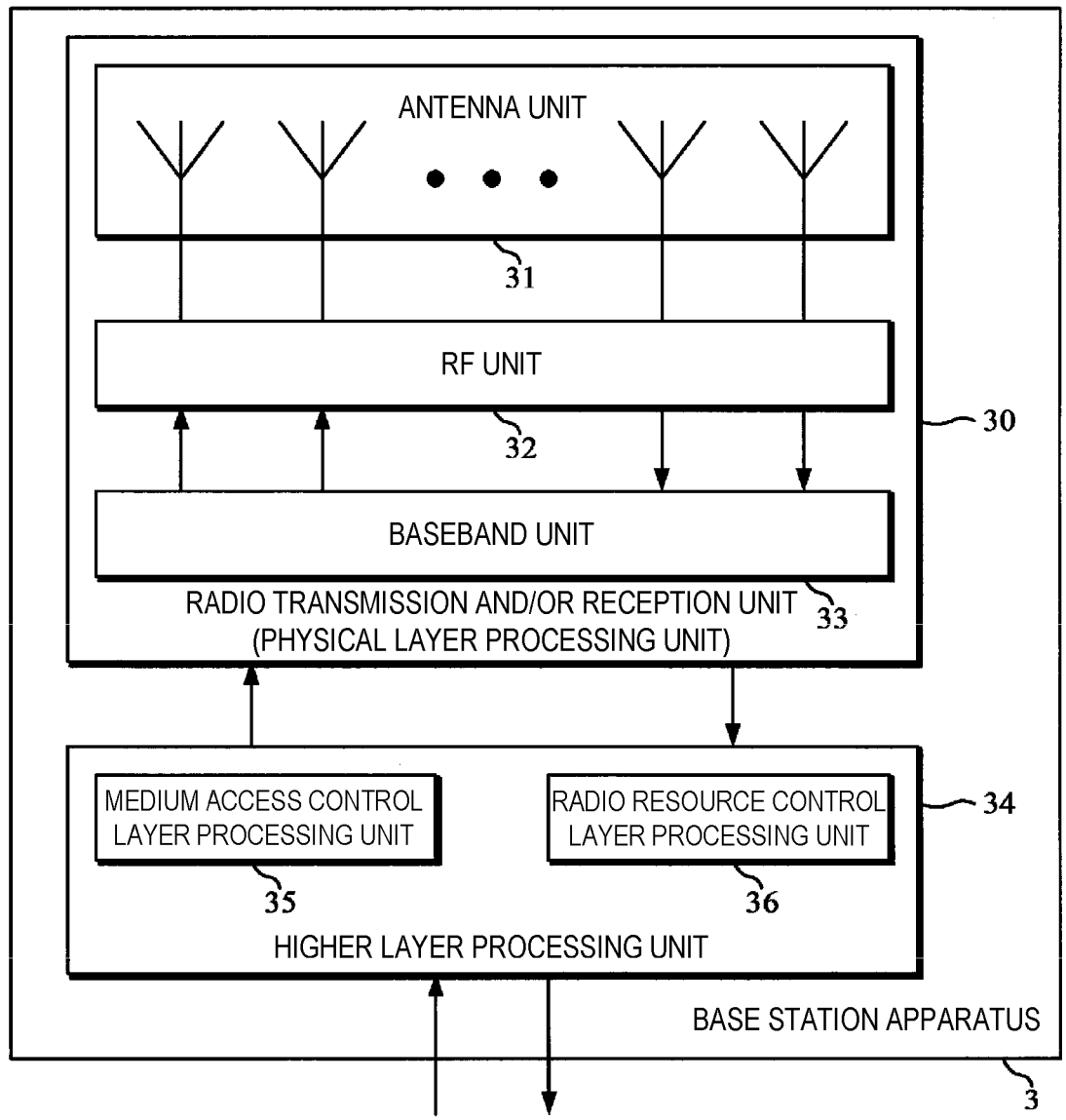
FIG. 11 is a schematic block diagram illustrating a configuration of a base station apparatus 3 according to an aspect of the present embodiment.

FIG. 11 is a schematic block diagram illustrating a configuration of the base station apparatus 3 according to an aspect of the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of an MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on a PDSCH, system information, an RRC message, an MAC CE, and the like, and outputs the data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of apparatuses according to one aspect of the present embodiment will be described below.

(1) To accomplish the object described above, aspects of the present invention are contrived to provide the following measures. In other words, a first aspect of the present invention is a terminal apparatus including a receiver configured to receive a DCI format including at least a resource assignment information field and receive a PDSCH based on the resource assignment information field, in which the resource assignment information field indicates a set of resource blocks to which the PDSCH is mapped among resource blocks included in a carrier bandwidth part in the frequency domain, in a case that the DCI format is a first DCI format including a CBP indication information field indicating a carrier bandwidth part in which the PDSCH is scheduled among multiple carrier bandwidth parts, the resource assignment information field indicates a set of resource blocks to which the PDSCH is mapped among resource blocks included in the carrier bandwidth part indicated by the CBP indication information field in the frequency domain, and in a case that the DCI format is a second DCI format not including the CBP indication information field, the resource assignment information field indicates a set of resource blocks to which the PDSCH is mapped among resource blocks included in a default carrier bandwidth part.

(2) Further, in the first aspect of the present invention, at least some of fields included in the first DCI format are configured at least based on first dedicated RRC signaling, and fields included in the second DCI format are configured regardless of the first dedicated RRC signaling.

(3) Further, in the first aspect of the present invention, in a case that the second dedicated RRC signaling including information on the configuration of the default carrier bandwidth part is received, the default carrier bandwidth part is given based on the second dedicated RRC signaling, and in a case that the second dedicated RRC signaling is not received, an initial active carrier bandwidth part is configured for the default carrier bandwidth part, and the initial active carrier bandwidth part is at least used to monitor a PDCCH used for scheduling of first system information.

(4) Further, in the first aspect of the present invention, in a case that the DCI format is the first DCI format, a size of the resource assignment information field corresponds to a maximum value of the number of RBGs configured for each of the multiple carrier bandwidth parts, and in a case that the DCI format is the second DCI format, the size of the resource assignment information field corresponds to the number of RBGs configured for the default carrier bandwidth part.

(5) Further, a second aspect of the present invention is a base station apparatus including a transmitter configured to transmit a DCI format at least including a resource assignment information field and transmit a PDSCH corresponding to the DCI format, in which the resource assignment information field indicates a set of resource blocks to which the PDSCH is mapped among resource blocks included in a carrier bandwidth part in the frequency domain, in a case that the DCI format is a first DCI format including a CBP indication information field indicating a carrier bandwidth part in which the PDSCH is scheduled among multiple carrier bandwidth parts, the resource assignment information field indicates a set of resource blocks to which the PDSCH is mapped among resource blocks included in the carrier bandwidth part indicated by the CBP indication information field in the frequency domain, and in a case that the DCI format is a second DCI format not including the CBP indication information field, the resource assignment information field indicates a set of resource blocks to which the PDSCH is mapped among resource blocks included in a default carrier bandwidth part.

(6) Further, in the second aspect of the present invention, at least some of fields included in the first DCI format is configured at least based on first dedicated RRC signaling, and fields included in the second DCI format are configured regardless of the first dedicated RRC signaling.

(7) Further, in the second aspect of the present invention, in a case that the DCI format is the first DCI format, a size of the resource assignment information field corresponds to a maximum value of the number of RBGs configured for each of the multiple carrier bandwidth parts, and in a case that the DCI format is the second DCI format, the size of the resource assignment information field corresponds to the number of RBGs configured for the default carrier bandwidth part.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these apparatuses is temporarily accumulated in a Random Access Memory (RAM) while being processed, and thereafter, the information is stored in various types of Read Only Memory (ROM) such as a flash ROM and a Hard Disk Drive (HDD), and read by the CPU to be modified or rewritten, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Moreover, the base station apparatus 3 according to the above-described embodiment may be an Evolved Universal Terrestrial Radio Access Network (EUTRAN) and/or a NextGen RAN (NG-RAN) or NR RAN. Moreover, the base station apparatus 3 according to the above-described embodiment may have some or all of the functions of a higher node for an eNodeB and/or a gNB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit
500 Serving cell
511, 512, 513 Carrier bandwidth part
501, 502, 503, 504, 505, 506 Resource block index
521, 523, 525, 527 PDCCH
522, 524, 526 PDSCH
531, 532 Timer

The invention claimed is:

1. A terminal apparatus configured to communicate with a base station apparatus in a serving cell, the terminal apparatus comprising:

Radio Resource Control (RRC) layer processing circuitry and reception circuitry, wherein the RRC processing circuitry is configured to configure, in the serving cell, a downlink (DL) bandwidth part based on first system information, the DL bandwidth part being set to an active DL bandwidth part;

the RRC layer processing circuitry is further configured to configure, in the serving cell, a control resource set based on a Master Information Block (MIB);

the reception circuitry is configured to monitor a first Physical Downlink Control Channel (PDCCH) with a first Downlink Control Information (DCI) format in the active DL bandwidth part, and is configured to monitor a second PDCCH with a second DCI format in the active DL bandwidth part, the reception circuitry is further configured to calculate a first number of bits of a first resource assignment field for a first Physical Downlink Shared Channel (PDSCH) in the first DCI format based on a number of resource blocks specifying a first frequency bandwidth for the active DL bandwidth part, the reception circuitry is further configure to calculate a second number of bits of a second resource assignment field for a second PDSCH in the second DCI format based on a number of resource blocks specifying a second frequency bandwidth for the control resource set; and the reception circuitry is further configured to monitor, on the control resource set, a third PDCCH to be used for scheduling the first system information.

2. The terminal apparatus according to claim 1, wherein the second number of bits is calculated regardless of the number of resource blocks specifying the first frequency bandwidth for the active DL bandwidth part.

3. A base station apparatus configured to communicate with a terminal apparatus in a serving cell, the base station apparatus comprising:
Radio Resource Control (RRC) layer processing circuitry and transmission circuitry, wherein
the RRC processing circuitry is configured to inform the terminal apparatus of a downlink (DL) bandwidth part, in the serving cell, by using first system information, the DL bandwidth part being set to an active DL bandwidth part, and
the RRC processing circuitry is further configured to inform the terminal apparatus of a control resource set in the serving cell by using a Master Information Block (MIB); and
the transmission circuitry is configured to transmit a first Physical Downlink Control Channel (PDCCH) with a first Downlink Control Information (DCI) format in the active DL bandwidth part, and configured to transmit a second PDCCH with a second DCI format in the active DL bandwidth part, wherein
the transmission circuitry is configured to calculate a first number of bits of a first resource assignment field for a first Physical Downlink Shared Channel (PDSCH) in the first DCI format based on a number of resource blocks specifying a first frequency bandwidth for the active DL bandwidth part,
the transmission circuitry is further configure to calculate a second number of bits of a second resource assignment field for a second PDSCH in the second DCI format based on a number of resource blocks specifying a second frequency bandwidth for the control resource set, and;
the transmission circuitry is further configured to transmit, on the control resource set, a third PDCCH to be used for scheduling the first system information.

4. The base station apparatus according to claim 3, wherein
the second number of bits is calculated regardless of the number of resource blocks specifying the first frequency bandwidth for the active DL bandwidth part.

5. A communication method for a terminal apparatus configured to communicate with a base station apparatus in a serving cell, the communication method comprising:
configuring, in the serving cell, a downlink (DL) bandwidth part by first system information, the DL bandwidth part being set to an active DL bandwidth part;
configuring, in the serving cell, a control resource set based on a Master Information Block (MIB);
monitoring a first Physical Downlink Control Channel (PDCCH) with a first Downlink Control Information (DCI) format in the active DL bandwidth part; and
monitoring a second PDCCH with a second DCI format in the active DL bandwidth part, wherein
calculating a first number of bits of a first resource assignment field for a first Physical Downlink Shared Channel (PDSCH) in the first DCI format based on a number of resource blocks specifying a first frequency bandwidth for the active DL bandwidth part,
calculating a second number of bits of a second resource assignment field for a second PDSCH in the second DCI format based on a number of resource blocks specifying a second frequency bandwidth for the control resource set, and
the communication method further comprises monitoring, on the control resource set, a third PDCCH to be used for scheduling the first system information.

6. A communication method for a base station apparatus configured to communicate with a terminal apparatus in a serving cell, the communication method comprising:
informing the terminal apparatus of a downlink (DL) bandwidth part in the serving cell by using first system information, the DL bandwidth part being set to an active DL bandwidth part;
informing the terminal apparatus of a control resource set in the serving cell by using a Master Information Block (MIB);
transmitting a first Physical Downlink Control Channel (PDCCH) with a first Downlink Control Information (DCI) format in the active DL bandwidth part; and
transmitting a second PDCCH with a second DCI format in the active DL bandwidth part, wherein
calculating a first number of bits of a first resource assignment field for a first Physical Downlink Shared Channel (PDSCH) in the first DCI format based on a number of resource blocks specifying a first frequency bandwidth for the active DL bandwidth part,
calculating a second number of bits of a second resource assignment field for a second PDSCH in the second DCI format based on a number of resource blocks specifying a second frequency bandwidth for a control resource set, and
the communication method further comprises transmitting, on the control resource set, a third PDCCH to be used for scheduling the first system information.

* * * * *